US010268502B2

(12) United States Patent
Doshi et al.

(10) Patent No.: US 10,268,502 B2
(45) Date of Patent: Apr. 23, 2019

(54) METHODS AND APPARATUS TO PERFORM ATOMIC TRANSACTIONS IN NONVOLATILE MEMORY UNDER HARDWARE TRANSACTIONAL MEMORY

(71) Applicant: Intel Corporation, Santa Clara, CA (US)

(72) Inventors: Kshitij A. Doshi, Tempe, AZ (US); Vadim Sukhomlinov, Santa Clara, CA (US); Roman Dementiev, Heidelberg (DE)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 15/637,476

(22) Filed: Jun. 29, 2017

(65) Prior Publication Data
US 2019/0004851 A1 Jan. 3, 2019

(51) Int. Cl.
*G06F 9/46* (2006.01)
*G06F 12/0831* (2016.01)
*G06F 9/30* (2018.01)

(52) U.S. Cl.
CPC .......... *G06F 9/466* (2013.01); *G06F 9/30072* (2013.01); *G06F 9/30087* (2013.01); *G06F 12/0833* (2013.01)

(58) Field of Classification Search
CPC .. G06F 9/466; G06F 9/30072; G06F 9/30087; G06F 12/0833
See application file for complete search history.

(56) References Cited

U.S. PATENT DOCUMENTS

| 5,799,305 | A | * | 8/1998 | Bortvedt | ............. G06F 9/466 |
| 2007/0214457 | A1 | * | 9/2007 | Goyal | ............. G06F 11/1438 718/101 |

(Continued)

OTHER PUBLICATIONS

Mohan et al., "ARIES: A Transaction Recover Method Supporting Fine-Granularity Locking and Partial Rollbacks Using Write-Ahead Logging," ACM Transactions on Database Systems, vol. 17, No. 1, Mar. 1992, 69 pages.

(Continued)

*Primary Examiner* — Ryan Bertram
(74) *Attorney, Agent, or Firm* — Hanley, Flight & Zimmerman, LLC

(57) ABSTRACT

A method to perform atomic transactions in non-volatile memory (NVM) under hardware transactional memory is disclosed. The method includes tracking an order among transaction log entries that includes arranging transaction logs in an order that is based on when corresponding transactions were executed. Moreover, the method includes, using the ordered transaction logs to recover data states of the nonvolatile memory, by identifying a first unconfirmed transaction associated with a transaction completion uncertainty event based on a corresponding one of the transaction logs including a first commit marker but not including a confirm marker, undoing first ones of the transactions in reverse time order starting at a last transaction that recorded a second commit marker, up to and including the first unconfirmed transaction that recorded the first commit marker, and redoing second ones of the transactions in forward time order from a first confirmed transaction up to but not including the first unconfirmed transaction that recorded the first commit marker.

26 Claims, 17 Drawing Sheets

(56) References Cited

U.S. PATENT DOCUMENTS

| | | | | |
|---|---|---|---|---|
| 2009/0157764 A1* | 6/2009 | Kundu | ............. | G06F 17/30415 |
| 2009/0164524 A1* | 6/2009 | Whang | ............... | G06F 11/1474 |
| 2014/0279931 A1* | 9/2014 | Gupta | ............... | G06F 17/30575 |
| | | | | 707/683 |
| 2016/0085772 A1* | 3/2016 | Vermeulen | ........ | G06F 17/30289 |
| | | | | 707/615 |
| 2016/0254915 A1* | 9/2016 | Jenkinson | ............. | H04L 9/3213 |
| | | | | 713/176 |
| 2017/0286150 A1* | 10/2017 | Wang | ...................... | G06F 17/00 |
| 2018/0232412 A1* | 8/2018 | Bensberg | .......... | G06F 17/30377 |
| 2018/0322156 A1* | 11/2018 | Lee | ................... | G06F 17/30353 |

OTHER PUBLICATIONS

Azul Systems, "Azul Systems Announces General Availability of Release 16.07 of Zing Runtime for Java," dated Sep. 7, 2016, retrieved from [https://www.azul.com/press_release/azul-systems-announces-general-availability-release-16-07-zing-runtime-java/] on Jan. 9, 2018, 5 pages.

Kamagel et al., "Improving In-Memory Database Index Performance with Intel® Transactional Synchronization Extensions," 20th International Symposium on High-Performance Computer Architecture, Feb. 15-19, 2014, 12 pages.

Kleen, "Scaling Existing Lock-based Applications with Lock Elision," Communications of the ACM, vol. 57, No. 3, Mar. 2014, 5 pages.

Yoo et al., "Early Experience on Transactional Execution of Java™ Programs Using Intel® Transactional synchronization Extensions," dated Feb. 10, 2014, retrieved from [http://transact2014.cse.lehigh.edu/yoo.pdf] on Jan. 9, 2018, 10 pages.

* cited by examiner

METHODS AND APPARATUS TO PERFORM ATOMIC TRANSACTIONS IN NONVOLATILE MEMORY UNDER HARDWARE TRANSACTIONAL MEMORY

FIELD OF THE DISCLOSURE

This disclosure relates generally to processor systems and, more particularly, to methods and apparatus to perform atomic transactions in nonvolatile memory (NVM) under hardware transactional memory.

BACKGROUND

Concurrent computing is a form of computing in which a number of computations are executed during overlapping time periods instead of sequentially (one completing before the next starts). Concurrency control ensures that correct results for concurrent operations are generated, while obtaining those results as quickly as possible. Mutual exclusion is a mechanism of concurrency control that enforces limits on access to a resource in an environment where there are multiple threads of execution that employ the resource.

Figure 1:
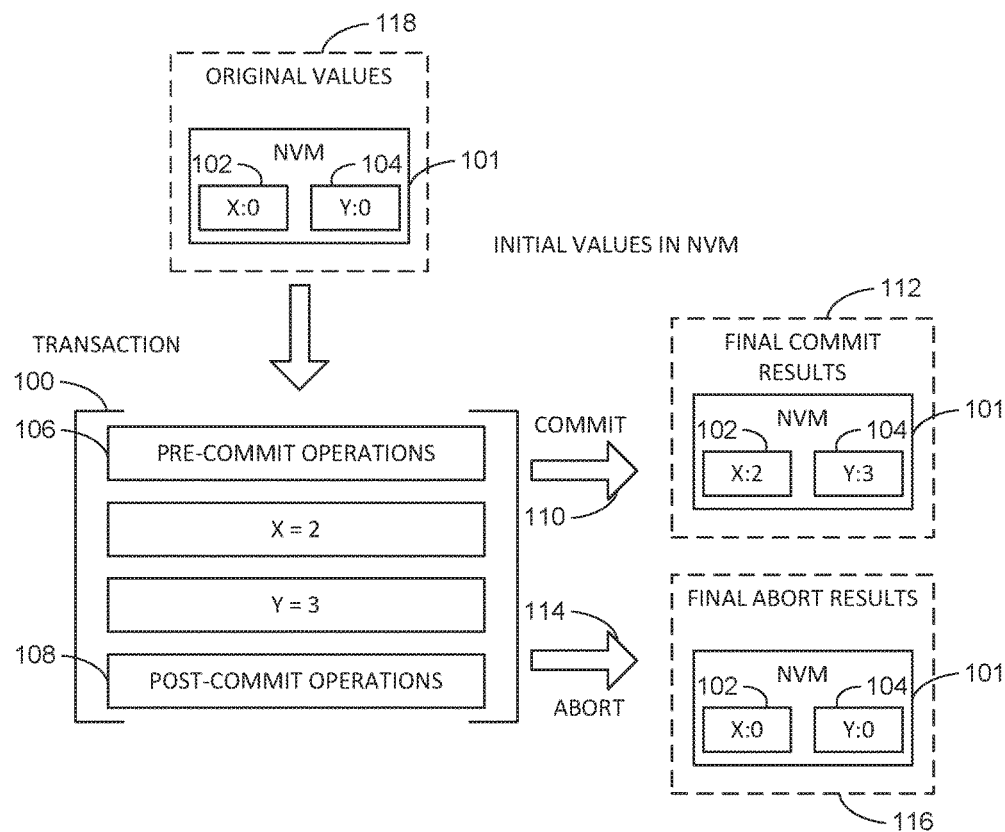
FIG. 1 shows example possible data outcomes resulting from executing an atomic transaction.

Although examples have been disclosed herein, such examples are not intended to be limited to the specific forms disclosed herein. On the contrary, examples disclosed herein are intended to cover such alternatives, modifications, and equivalents as can be reasonably included within the scope of the inventions as defined by the appended claims. In some examples, well-known structures, elements, or connections have been omitted, and/or have not been described in particular detail in order to avoid unnecessarily obscuring examples disclosed herein.

DETAILED DESCRIPTION

Examples disclosed herein enable performing atomic transactions in nonvolatile memory (NVM) under hardware transactional memory. A transaction is a collection of operations that can execute and commit changes as long as another operation does not create a conflict by accessing a memory resource that is in use by the transaction. When a conflict is detected, changes made in memory by the transaction will be reverted to their initial state (e.g., the store data states before the transaction started execution) and the transaction will rerun until it can finish completely without conflicts. Before a successful commit, the outcome of any operation is purely speculative inside a transaction. It is speculative because there are no assurances that a transaction will be able to execute completely without encountering a resource conflict and needing to restart. In contrast to lock-based synchronization where operations are serialized to prevent data corruption, transactions allow for additional parallelism (e.g., multi-thread operations) as long as few operations attempt to modify a shared resource. In operation, transactions use data resources without acquiring locks on those resources. Before committing, each transaction verifies that no other transaction has modified the data it has read. If the check reveals conflicting modifications, the committing transaction rolls back any changes it may to data and can be restarted. Transactions are generally used in environments with low data contention. When conflicts are rare, transactions can complete without the expense of managing locks and without having transactions wait for other transaction locks to clear, leading to higher throughput than other concurrency control methods.

Computing systems typically employ hardware transactional memory and multi-threading capabilities to facilitate executing transactions in parallel. For example, multi-threading capabilities enable executing multiple transactions by corresponding threads simultaneously. Hardware transactional memory facilitates concurrent transaction execution by enabling threads to run in parallel to, for example, execute load instructions and store instructions of respective transactions atomically. Atomicity means that executing an atomic transaction involves an end result reflective of executing either all operations of the transaction, or executing none (e.g., as if the transaction were not executed at all). As such, a result may either be an original value that existed in a target memory location before an atomic transaction started executing (e.g., the original value as if none of the operations of the atomic transaction executed), or may be an output value resulting from executing all operations of the atomic transaction.

In any case, any changes in data values made during a partial execution of an atomic transaction are discarded if the atomic transaction does not fully complete and commit its output to a globally visible storage location (e.g., a storage location at which the data is persisted and is accessible by other processes of a computing environment). For example, if an atomic transaction involves changing an intermediate value in a first cache location while calculating an output value in a second cache location, the intermediate value in the first cache location and the output value in the second cache location become globally visible to other processes/threads in the computing system when the atomic transaction completes and reaches a commit status. In this manner, when the intermediate and output values become globally visible they reflect execution of the atomic transaction in its entirety. However, if the atomic transaction is partially executed, and it is aborted before it reaches a commit status, the values of the first and second cache locations are reverted to their original values as if none of the operations of the atomic transaction were executed.

Hardware transactional memory is memory in a computing system that enables atomicity of transaction execution in a system-inherent manner without requiring manual programmer intervention to ensure atomic all or none types of transaction executions. For example, executing a transaction with atomicity requires locking memory locations corresponding to the transaction from being accessed during the transaction execution. A manual technique for implementing such locking involves a programmer explicitly including memory locking/unlocking programming statements for each transaction. However, hardware transaction memory in a computing system eliminates the need to manually include such memory locking/unlocking programming statements. Instead, in many types of hardware transactional memory, CPU hardware isolates cache lines of various data locations accessed during execution of a transaction, such that speculative stores of the transaction performed to those data locations are not reflected into memory until the transaction completes, and, such that the speculative stores are automatically discarded by the CPU hardware if the transaction aborts.

Non-volatile memory (NVM) stores data in a persistent manner regardless of whether power is actively being supplied to the NVM. That is, while power is applied, data can be written/programmed to and read from the NVM memory. When power is removed, the NVM maintains the stored data. Examples of NVM memory include NAND flash memory, NOR flash memory, multiple bit-per-cell flash memory, single or multi-level Phase Change Memory (PCM), resistive memory, nanowire memory, ferroelectric transistor random access memory (FeTRAM), magnetoresistive random access memory (MRAM) that incorporates memristor technology, spin transfer torque (STT)-MRAM, or a combination of any of the above, or other memory. Examples disclosed herein use NVM memory to store transaction status logs indicative of transaction progress during transaction execution. In this manner, if an unexpected system failure occurs (e.g., a system crash) during a transaction execution, the status of memory changes made by the transaction can be persisted through the crash and accessed after recovering from the crash. In this manner, the transaction status logs can be used by the system to either (1) restore original values that existed before the incomplete transaction started, or (2) continue executing the incomplete transaction based on the data stored in the transaction status logs.

Examples disclosed herein include hardware-based techniques and software-based techniques for performing atomic transactions in NVM under hardware transactional memory by providing a lightweight, fine-grained solution to enable mutual exclusion for data updated in persistent memory in connection with executing such atomic transactions. Fine-grained mutual exclusion refers to the isolation of speculative memory regions corresponding to ongoing transactions on a per-transaction granularity and thereby, both excluding access to those regions by other processes/threads and detecting that such accesses are attempted, during the transaction executions. For example, mutual exclusion can be implemented by limiting access to a resource (e.g., a memory location, a buffer, etc.) in an environment where there are many threads of execution that act on or employ that resource. Disclosed examples can be lightweight in that they add little overhead in terms of processing and/or hardware requirements. For example, hardware-based solutions disclosed herein employ one comparison operation to enforce a transactional synchronization extension (TSX) protocol, do not require the creation of a separate copy of an original state of memory before a transaction starts executing, and do not require determining intersections between speculative and non-speculative memory accesses (e.g., simultaneous accesses of a same memory location).

Examples disclosed herein are described in connection with transactions implemented using a transactional synchronization extensions (TSX) protocol. However, the exact TSX instructions of the instruction set architecture (ISA) of the TSX protocol are not required and the concepts described herein are applicable to other transactional memory. As used herein, the term transactional synchronization extensions (TSX) refers to an extension to the x86 instruction set architecture (ISA) that adds hardware transactional memory support. As used herein, durably commit refers to committing data in a durable or permanent manner so that it is globally visible to other processes/threads and survives an unintended restart of hardware. Durability or permanency of data can be achieved by flushing or writing back data from cache to NVM storage. As used herein, an XBEGIN instruction refers to an instruction to begin execution of a transaction. As used herein, an XEND instruction refers to an instruction that identifies the end of a transaction. As used herein, a COMMIT operation refers to an instruction to store a flag or marker in a persistent memory location as an indication that a transaction has performed all its speculative stores and is ready to exit the transactional region, having also recorded the pre- and post-transactional values into auxiliary backup locations in persistent memory (e.g., in a persistent manner in accordance with NVM storage capabilities). As used herein, a CONFIRM operation refers to a storing instruction that records a flag in a persistent memory location to indicate that a transaction having previously performed a COMMIT operation has also successfully exited the transactional region without being canceled by any conflicts since the COMMIT operation. As used herein, a store fence (SFENCE) instruction refers to an instruction that controls write ordering by creating a fence to bound memory store operations. For example, by using the SFENCE instruction, a fence bounds a number of store instructions to guarantee that data stored by those store instructions preceding the fence (e.g., the SFENCE instruction) in a program order is globally visible before execution of any store instruction following the fence (i.e., the SFENCE instruction). As used herein, a DECOMMIT operation refers to an instruction that stores a flag or a marker in a persistent memory location to indicate that a transaction encountered a resource conflict and, therefore, having exited the transactional region, retracts its COMMIT operation if it has performed one. As used herein, an UNDO operation refers to instructions to undo any changes performed by transactions that have been committed (e.g., by a COMMIT operation) but not confirmed (e.g., by a CONFIRM operation). As used herein, a REDO operation refers to instructions to reprocess logged transactions. As used herein, a FLUSH instruction is intended to refer to an instruction to write values from cache to memory (e.g., NVM). As used herein, an ABORT instruction refers to an instruction to abort a transaction. A transaction may also abort involuntarily (e.g., without using an ABORT instruction) when a CPU and/or hardware detects a resource conflict and causes it to abort. As used herein, a Move Non-Temporal (MOVNT) instruction refers to an instruction to write data directly to memory while bypassing cache based on a non-temporal hint (e.g., a bit or flag indicating that the information will not be reused soon and, therefore, does not need to be cached but can instead be written directly to memory). As used herein, a Cache Line Write Back (CLWB) instruction refers to an instruction that causes modified data to be written to memory while also retaining the modified data in cache. Upon completion of a CLWB instruction, the processor hardware may have initiated, but not yet completed, the storing of the modified data into persistent memory and, therefore, a program may use an SFENCE instruction in conjunction with a plurality of previously issued CLWB instructions to achieve a guarantee that the modified data is in persistent memory before the program continues past the SFENCE instruction.

FIG. 1 shows example possible data outcomes resulting from executing an atomic transaction. Examples disclosed herein may be used to generate such data outcomes in a manner that ensures transaction atomicity while improving over prior art techniques for executing transactions. An example transaction 100 includes different operations representative of computer readable instructions employed to access and modify variable values X 102 and Y 104. In some examples, the transaction 100 may be implemented using the example transaction structure shown in FIG. 6 in accordance with the teachings of this disclosure. In the illustrated example of FIG. 1, the transaction 100 includes pre-commit operations 106 and post-commit operations 108.

In FIG. 1, the variable values X 102 and Y 104 are located in NVM memory 101. If the example transaction 100 successfully commits as shown at reference numeral 110 (e.g., the transaction 100 records that it has stored the variable values X 102 and Y 104 to globally visible NVM storage locations), the variable values X 102 and Y 104 represent final commit results 112 based on a complete execution of the transaction 100. Otherwise, if the example lock-based serialization transaction 100 aborts before completion (e.g., does not successfully commit) as shown at reference numeral 114, the variable values X 102 and Y 104 represent final abort results 116 which include original values 118 that were persisted in the NVM memory 101 before the transaction 100 started (e.g., as if the transaction 100 never started). The restoring of the original values 118 upon the abort 114 in the illustrated example of FIG. 1 is implemented by maintaining persistent logs that include undo and redo records as described below in connection with FIG. 2.

Figure 2:
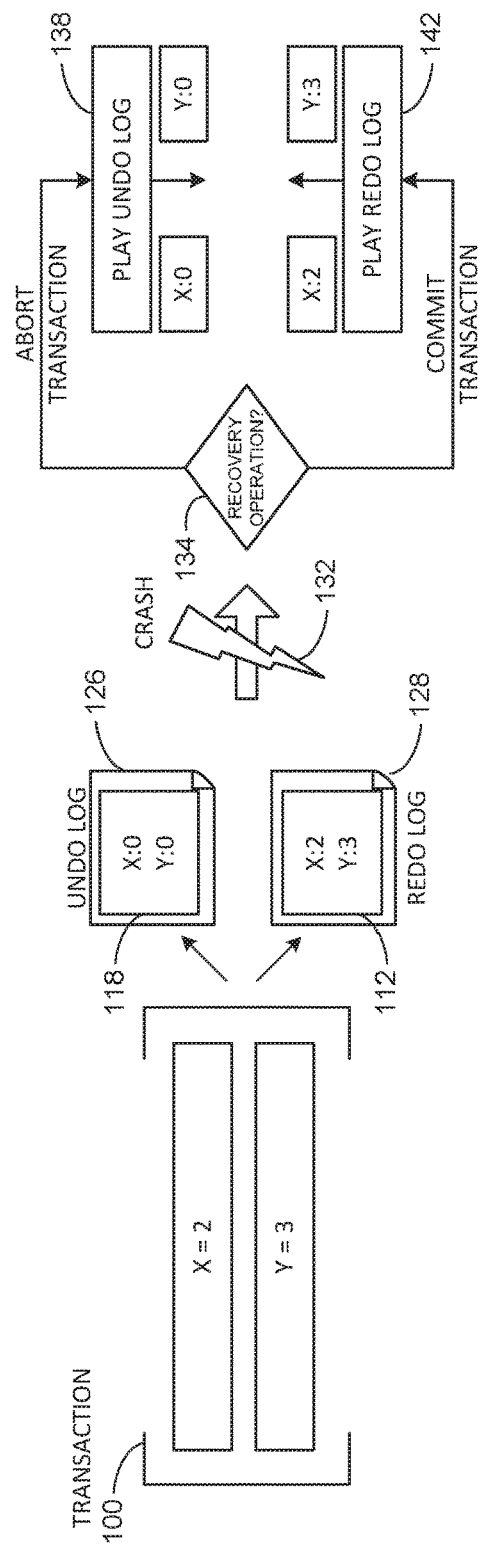
FIG. 2 illustrates an example recovery procedure to recover when the transaction of FIG. 1 aborts before completion but modifies the values of the persistent memory locations before the abort.

FIG. 2 illustrates an example recovery procedure to recover when the prior lock-based serialization transaction 100 of FIG. 2 aborts before completion but modifies the variable values X 102 and Y 104 (FIG. 1) of the NVM memory 101 before the abort. The illustrated example of FIG. 2 includes an undo log record 126 that includes recovery values of the original values 118 (FIG. 2) of the variable values X 102 and Y 104. The example undo log record 126 may be used to restore the original values 118 of the variable values X 102 and Y 104 in the NVM memory 101 when the transaction 100 of FIG. 1 aborts before completion but modifies the variable values X 102 and Y 104 to, for example, intermediate values, during its partial execution. The illustrated example of FIG. 2 also includes a redo log record 128 that includes recovery values of the final commit results 112 (FIG. 1) of the variable values X 102 and Y 102. The example redo log record 128 may be used to complete the committing of the final commit results 112 to the NVM 101 if the transaction 100 finished execution but did not flush the final commit results to the NVM 101 before the abort.

In the illustrated example of FIG. 2, following an unexpected system failure such as a crash 132, the system determines a recovery operation (at decision block 134) to use to restore or update the variable values X 102 and Y 104 to a valid state in the NVM 101. If the transaction 100 did not complete before the crash 132, the system determines to abort the transaction 100 by performing a play undo log operation 138 based on the undo log 126. In this manner, the play undo log operation 138 restores the variable values X 102 and Y 104 to the original values 118 in the NVM 101. Otherwise, if the transaction 100 completed before the crash 132 but did not commit the final results 116 (FIG. 1) of the variable values X 102 and Y 104 to NVM 101, the system determines to safely recommit the transaction 100 by performing a play redo log operation 142 based on the redo log 128. In this manner, the play redo log operation 142 updates the variable values X 102 and Y 104 to the final commit results 112 (FIG. 1) in the NVM 101.

Figure 3:
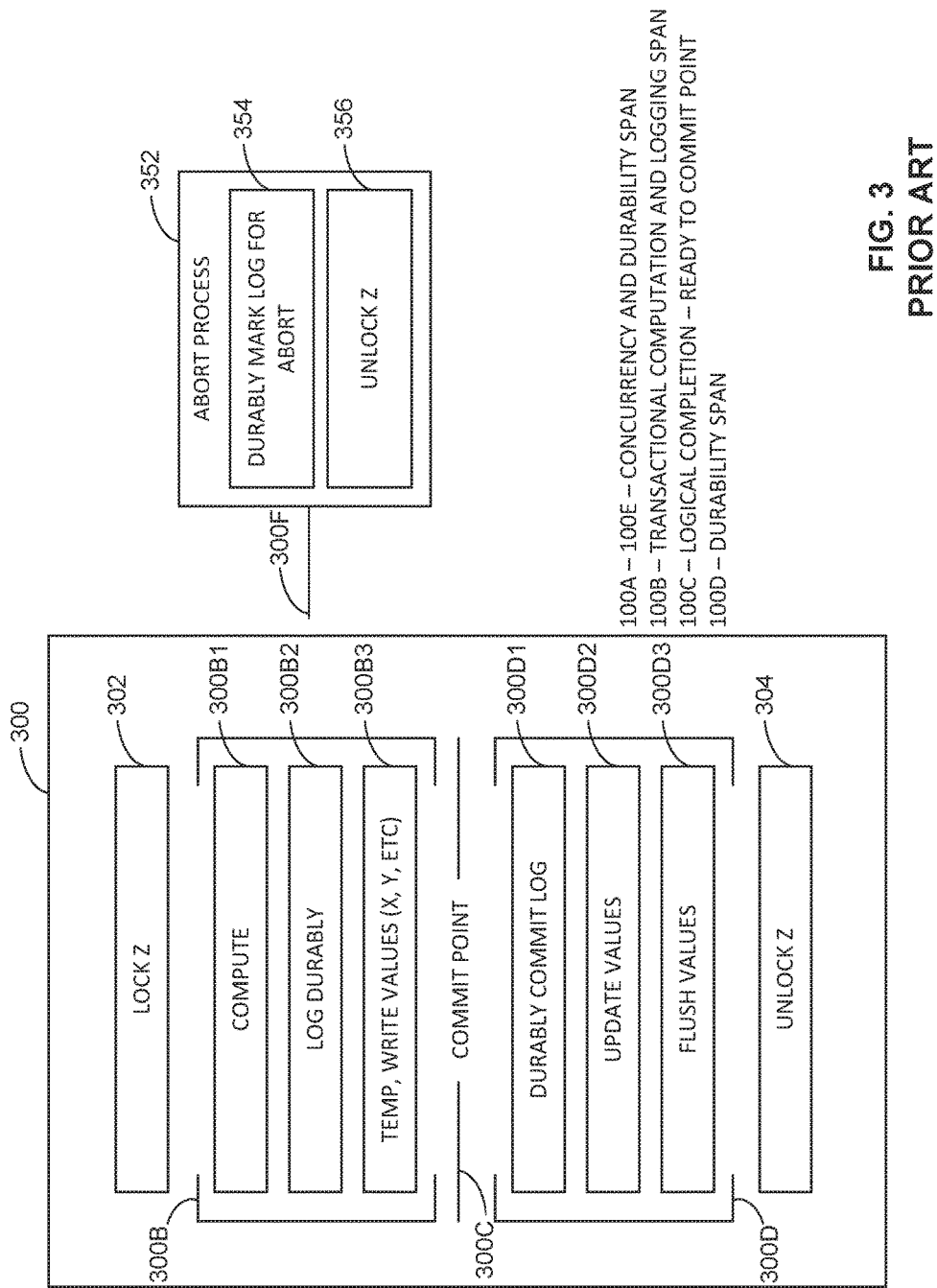
FIG. 3 illustrates a prior technique that may be used to atomically execute a lock-based transaction that modifies data in persistent memory.

FIG. 3 illustrates a prior technique that may be used to execute a locked-based transaction 300 in an atomic manner. A lock-based transaction is a transaction for accessing data in a memory (e.g., read, write) that is subject to a lock. A lock-based transaction implements a lock on resources (e.g., a collection of addresses in NVM) associated with the transaction as a synchronization mechanism for enforcing limits on accesses to the resource. Such transactions implement mutual exclusion of a resource (e.g., a mechanism of concurrency control that enforces limits or locks on accesses to the resource, such as a memory address range, in an environment in which multiple threads act on or employ the same resource). The example lock-based transaction 300 of FIG. 3 implements mutual exclusion of access to an address range of an NVM resource that include memory locations (e.g., the variable values X 102 and Y 104 of FIGS. 1 and 2) on which the transaction 300 operates. Referring to FIG. 3, the structure of the prior lock-based transaction 100 for modifying values in the NVM memory 101 includes a number of operations that may be implemented using computer readable instructions to execute the transaction 300. The example operations include a lock operation 302, pre-commit operations 300B performed before a transaction commit point 300C, post-commit operations 300D performed after a transaction commit point 300D, and an unlock operation 304.

The example lock operation 302 is used to lock access to memory resources (e.g., the variable values X 102 and Y 104 in FIG. 1) accessed by the transaction 300 before the lock-based transaction 300 begins so that the transaction 300 has access to the memory resources exclusive of other processes or threads. For example, during operation, the transaction 300 may store intermediate (e.g., non-final) values in the memory resources before the transaction 300 finishes. By using the lock operation 302, other processes or threads are excluded from accessing the memory range used by the transaction 300 so that such other processes or threads cannot use incorrect (e.g., intermediate) values from those memory resources before the transaction 300 completes. In addition, such other processes or threads cannot change (e.g., write to) the memory resources during execution of the transaction 300, which would otherwise most likely result in the transaction 300 producing erroneous results based on values stored in those memory resources by such other processes. The unlock operation 304 is used to unlock access to the memory range accessed by the transaction so that access to the memory resources is no longer exclusive to the performer of transaction 300. The pre-commit operations 300B include a computing operation 300B1, a durably log resulting values operation 300B2, and a temporary write values operation 300B3. The post-commit operations 300D include a durably commit log operation 300D1, an update values operation 300D2, and a flush values operation 300D3.

In addition, FIG. 3 shows an example abort process 352. The abort process 352 of the illustrated example is shown as having two operations which include a durably mark transaction log records for abort operation 354 and an unlock operation 356. The abort process 352 of FIG. 3 handles a graceful exit from the transaction 300 should the transaction 300 abort before completion. For example, the pre-commit operations 300B and the post-commit operations 300D are bounded by the lock operation 306 to start mutual exclusion of the memory resources used by the transaction 300 during execution of the transaction 300 and by the unlock operation 304 to enable global access to those memory resources when the transaction 300 is complete. However, if the transaction 300 aborts after the lock operation 302 and mutual exclusion of the memory resources is in effect, the abort process 352 includes an unlock operation 356 to facilitate a graceful exit from the transaction 300. For example, in the abort process 352, the durably mark log for abort operation 354 is used to revert the data in the memory resources to their original values as persisted before the start of the transaction 300, and the unlock operation 356 releases from the mutual exclusion of the memory resources.

Disadvantages of lock-based serialized systems, include the need to: (a) perform multiple synchronous writes (to ensure an untimely machine failure doesn't corrupt data) or cache flushes, (b) track the values that have been written to NVM and the other values they need to be consistent with, and (c) coordinate between logging and data updates. Moreover, transaction times become longer due to the latencies of the synchronous writes which can cause an extension of lock hold times, and a reduction in concurrency. In addition, the use of prior lock-based transactions requires designers to make lock granularity versus overhead (e.g., latency) tradeoffs, retune algorithms as core counts increase to improve performance and reorder locks to prevent deadlocks or to cover newly exposed races (e.g., transactions that are revealed through examining code, testing or usage as presenting a risk of occurring in an unintended sequence).

Other prior techniques for executing transactions include TSX-based serialization approaches. TSX approaches are used in applications involving databases, multithreaded object systems, big data, key-value stores, etc. An atomic region is a region of code that includes a series of operations that either all must be executed to completion or none must be executed. However, TSX does not address the challenge of ensuring durability (e.g., a guarantee that a TSX transaction is durably committed before the end of the TSX transaction). While approaches have been proposed in both industrial and academic research arenas that blend hardware transactions with NVM to complement atomicity (from TSX) with persistence (from NVM), they generally involve a significant hardware burden (e.g., a TSX state engine that has to track whether loads/stores are non-transactional and whether they share cache lines with other loads/stores that are transactional). The reason that combining TSX and NVM presents challenges is that TSX is designed to isolate modified cache lines (e.g., make them non-visible) until the end of a transaction, while durable writes to NVM require modified to be flushed out of caches before the end of a transaction. For example, in addition to increased circuitry requirements (e.g., circuitry of a transaction manager), such approaches may impose burdensome hardware checking that introduces additional time and power costs.

Figure 4:
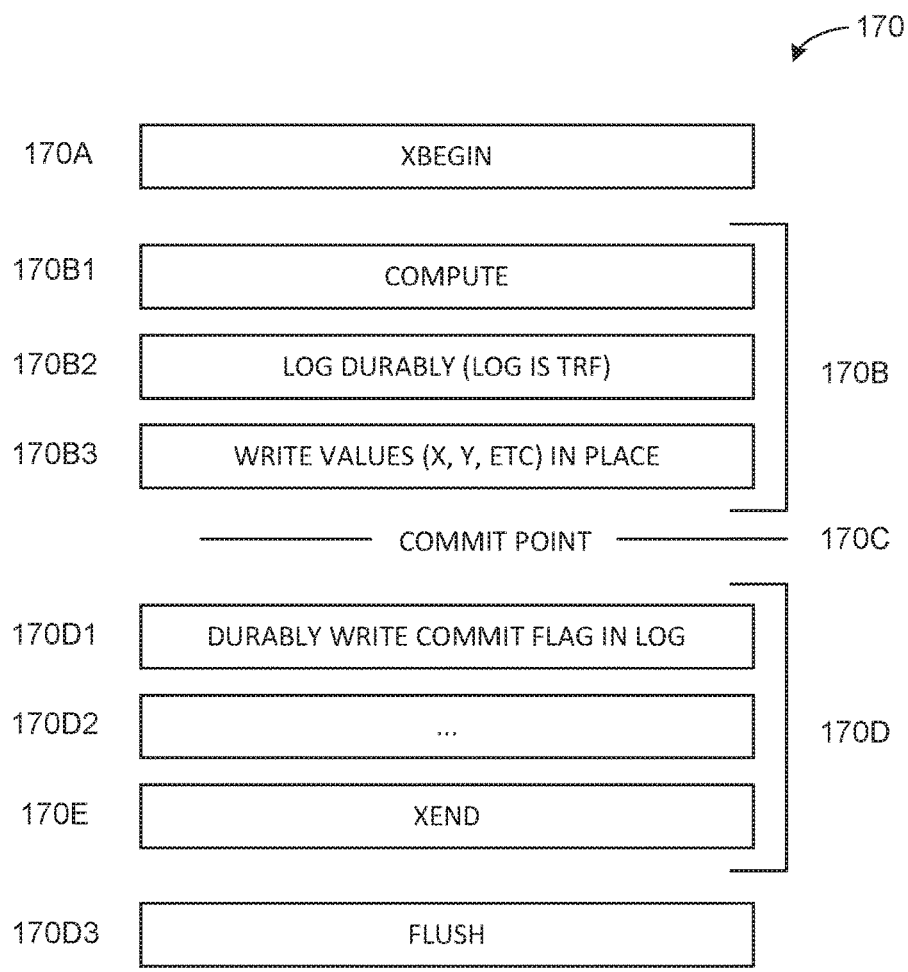
FIG. 4 illustrates another prior technique that may be used to execute a transactional synchronization extension (TSX) transaction that erroneously commits even though it is subject to a TSX abort.

FIG. 4 shows prior TSX instructions 170 that may be executed to implement a lockless TSX transaction. A lockless TSX transaction is a transaction that does not use a LOCK instruction and may be used to speedup execution of multithreaded processes. In the illustrated example of FIG. 4, the lockless TSX transaction 170 includes a number of instructions represented as an XBEGIN operation 170A, a COMPUTE operation 170B1, a log durably operation 170B2, a write values in place operations 170B3, a COMMIT point operation 170C, a durably write commit flag in log operation 170D1, an XEND operation 170E and a FLUSH operation 170D3. In the illustrated example, the instructions XBEGIN 170A and XEND 170E mark the start and end of the TSX transaction 170 instead of LOCK and UNLOCK instructions of other prior lock-based approaches. In some examples, redo and undo transaction log records associated with COMPUTE 170B1 instructions are stored directly in the nonvolatile memory. Example transaction log records for WRITE values are durably committed with a COMMIT flag. In addition, data updates are flushed (e.g., written back) to nonvolatile memory after execution of the XEND instruction 170E instead of before the execution of the XBEGIN instruction 170A, which would abort the prior lock TSX transaction 170.

Prior TSX transaction 170 can result in ambiguities when machine failures occur (a) between the end of durably writing a commit flag 170D1 in the transaction log record and the end of flushing values 170D3, or (b) after a TSX abort, following durably writing a COMMIT flag 170D1, but before the COMMIT is de-committed (e.g., when a previously logged COMMIT operation is withdrawn by a TSX abort).

In yet another prior approach, hardware transactional memory (HTM), is designed to support non-transactional loads and stores. In this approach, non-transactional loads and stores are used to support flexible implementation of the all-or-nothing aspect of pure transactional memory (e.g., by allowing threads the capacity to communicate or coordinate with one another to ensure consistency). However, support for such non-transactional accesses imposes significant overhead (e.g., component, processing). As such, non-transactional HTM accesses are less attractive from cost, complexity, and performance standpoints. Even setting aside the high cost of supporting non-transactional HTM accesses, it is problematic. For example, using this approach, it is problematic, to support NVM consistency (validity of data stored in NVM) unless the point of durable commit is precisely synchronized with the release of a hardware transactional scope.

Examples disclosed herein overcome drawbacks of prior serialization techniques while providing lightweight fine grained mutual exclusion for data updated in persistent memory. For example, approaches disclosed herein include lockless transactions and avoid the overhead associated lock based serialization approaches. In addition, examples disclosed herein eliminate or reduce the ambiguities presented by prior TSX approaches that can result from machine failure.

Figure 5:
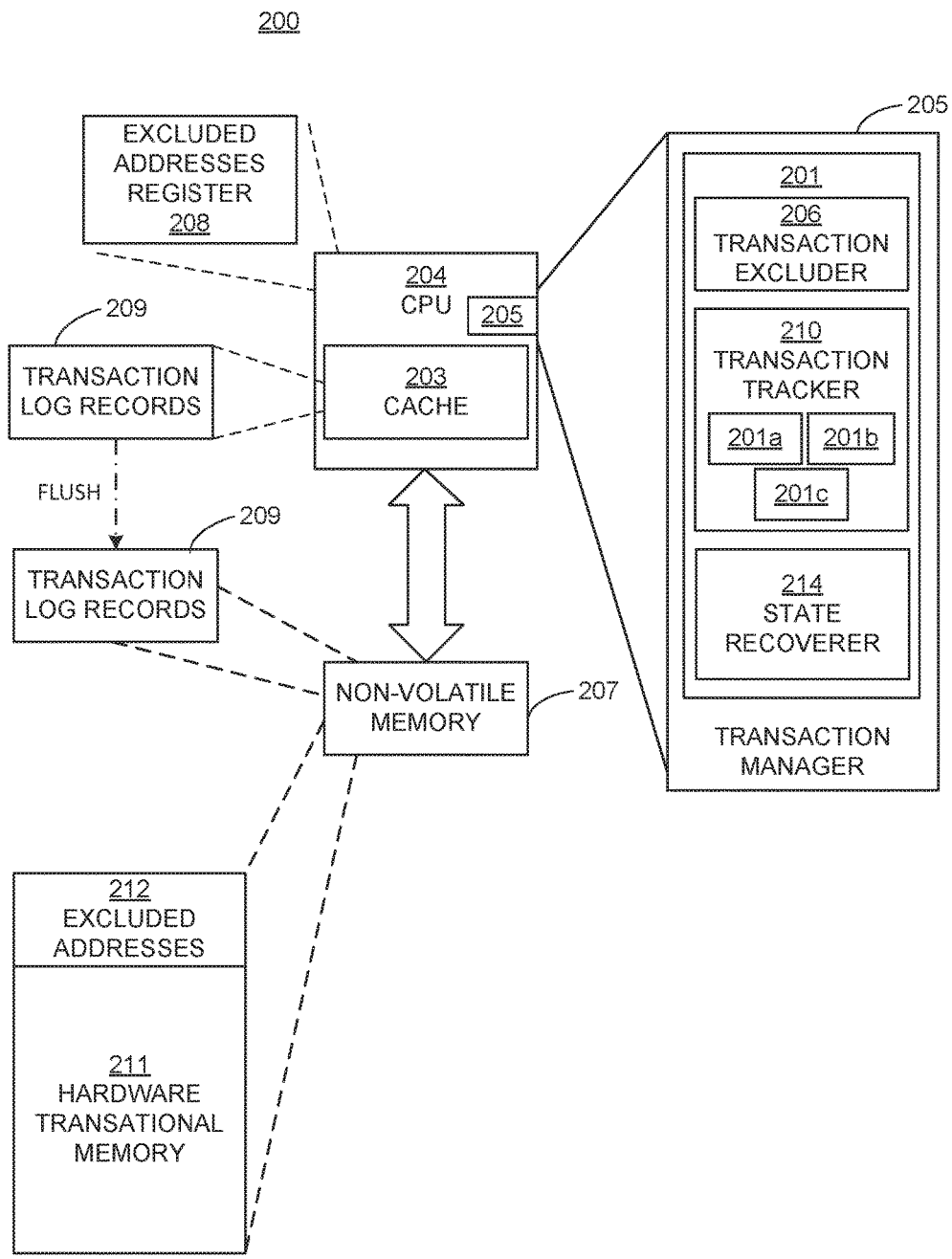
FIG. 5 shows an example operating environment of an example transaction execution manager to implement transaction execution atomicity in nonvolatile memory (NVM) under hardware transactional memory in accordance with the teachings of this disclosure.

FIG. 5 shows an example platform 200 that includes an example transaction execution manager 201 for implementing transaction execution atomicity in nonvolatile memory (NVM) under hardware transactional memory. The example transaction execution manager 201 durably commits TSX transaction log records 209 and establishes an unambiguous order among them. This enables the example transaction execution manager 201 to distinguish between the transactions that execute XEND instructions and thereafter are untracked in transaction log records, and other transactions that execute XEND instructions and are tracked in transaction log records. In addition, the example transaction execution manager 201 provides a method for recovery that addresses transaction failure, and a method for reducing or eliminating residual side effects (e.g., side effects such as network messages forwarded based on a transaction later determined to be unreliable). The example platform 200 of FIG. 2A includes the example transaction execution manager 201, an example CPU cache 203, an example CPU 204, an example transaction manager 205, an example transaction excluder 206, an example non-volatile memory (NVM) 207, example transaction log records 209, an example transaction tracker 210, an example hardware transactional memory 211, example excluded addresses 212 and an example state recoverer 214.

Referring to the illustrated example of FIG. 5, the transaction manager 205 monitors multiple threads executing on the CPU 204 for memory access conflicts that can arise when a transaction is to concurrently access a memory address that is currently being accessed by another transaction. Additionally, the transaction manager 205 manages accesses to memory by those threads. The transaction manager 205 aborts transactions that cannot be successfully completed without conflicts and rolls back the resulting data as TSX is designed to do (e.g., previously modified data that is associated with the aborted transaction is restored to a state of data that existed prior to beginning execution of the transaction). The example, transaction manager 205 enables speculative execution (completion of transaction not assured) in transactional code regions. In the illustrated example, the transaction manager 205 includes an example transaction execution manager 201 as shown in FIG. 5. In other examples, the transaction manager 205 can be separate from the transaction execution manager 201 but operate cooperatively therewith. The transaction execution manager 201 is described herein in detail below.

Figure 6:
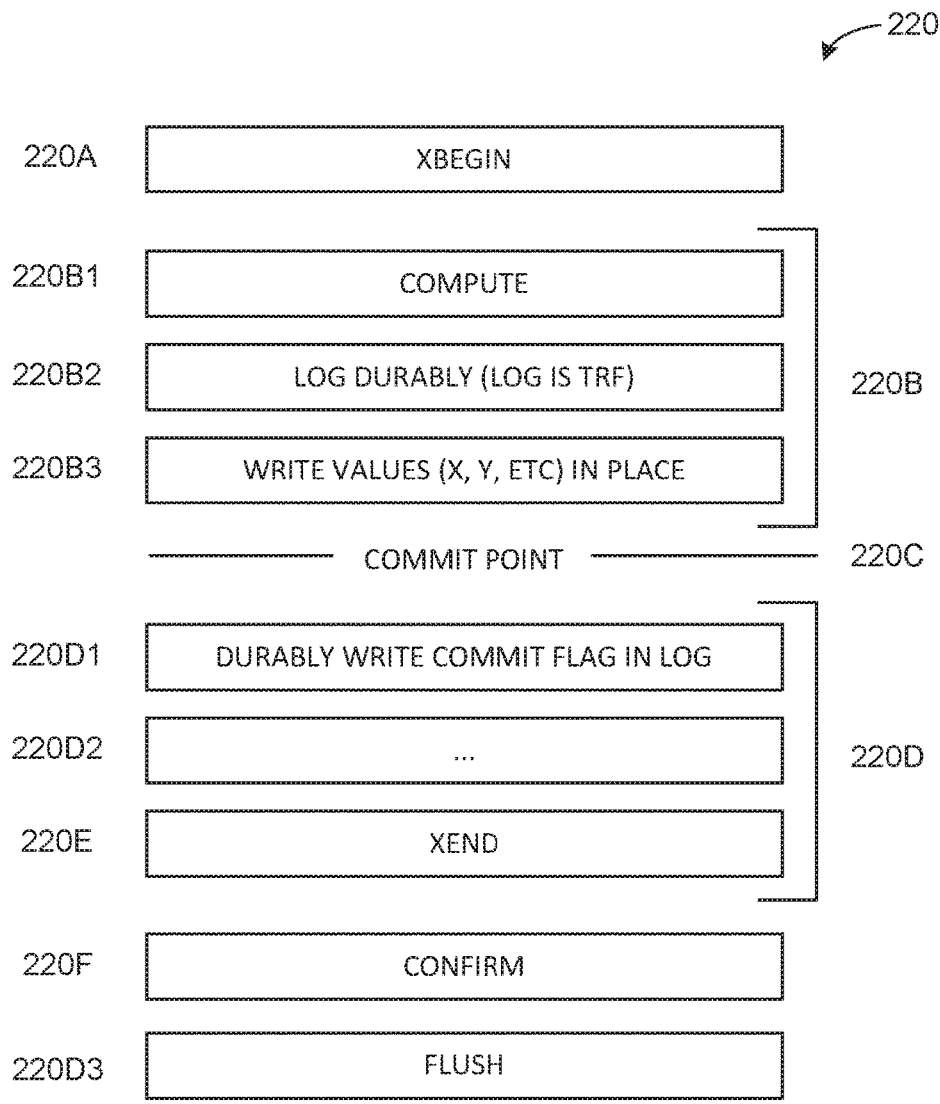
FIG. 6 shows an example TSX transaction that may be executed by the central processing unit (CPU) of FIG. 2A to implement the TSX transaction.

FIG. 6 shows example TSX instructions that may be executed by the example CPU 204 to implement a lockless TSX transaction 220. A lockless TSX transaction is a transaction that does not use a LOCK instruction and may be used to speedup execution of multithreaded processes. In the illustrated example of FIG. 6, the lockless TSX transaction 220 includes a number of instructions represented as an example XBEGIN operation 220A, an example COMPUTE operation 220B1, an example log durably operation 220B2, an example write values in place operation 220B3, an example COMMIT point 220C, an example durably write commit flag in log operation 220D1, an example XEND operation 220E, an example CONFIRM operation 220F and an example FLUSH operation 220D3. In the illustrated example, the CONFIRM operation 220F is the last write action in the TSX transaction (it follows the XEND operation and ends the transaction). In prior TSX-based approaches the XEND operation ends the TSX transaction.

In some examples, redo and undo transaction log records 209 (e.g., stored in the example undo/redo log 261 of FIG. 8) associated with COMPUTE operation 220B1 are stored directly in the NVM 207 (described herein in detail below). Example transaction log records for WRITE values are durably stored with a COMMIT tag/marker. In addition, data updates are flushed (e.g., written back) to the example NVM 207 (FIG. 5) from the example CPU cache 203 (FIG. 5) after the execution of the CONFIRM instruction. In contrast to prior TSX transactions (e.g., prior TSX transaction 170 of FIG. 4), the example TSX transaction 220 of FIG. 6 includes the CONFIRM operation 220F between the XEND operation 220E and the FLUSH operation 220D3. Moreover, in some examples, the example TSX transaction 220 is subject to transaction order tracking and transaction state tracking using monotonic counter 201a (an atomic counter that is incremented by one), transaction state tracker 201b and time value token provider 201c, such as is shown in FIG. 5 (also see FIG. 15 and accompanying description).

Figure 7:
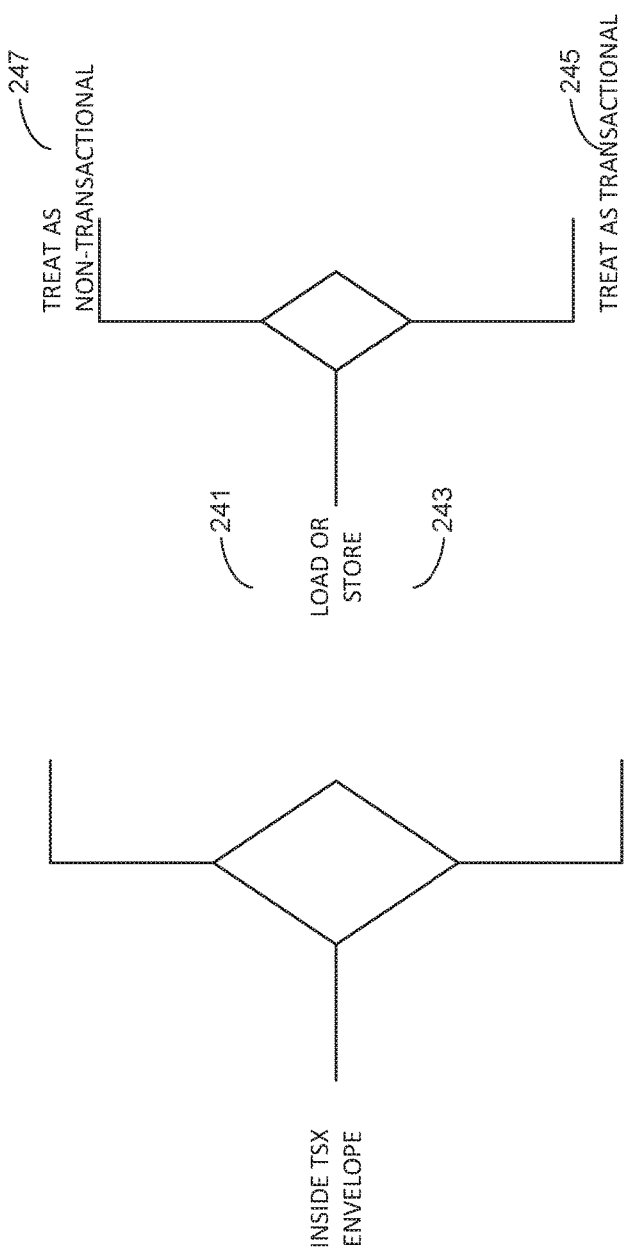
FIG. 7 illustrates an example decision process implemented to exclude loads and stores that are associated with a specified range of physical addresses from a range of serialized code that is tracked by the transaction manager of FIG. 5.

Referring back to the example of FIG. 5, the transaction execution manager 201 includes a transaction excluder 206 to exclude non-transactional LOAD and STORE instructions from transactional treatment if they respectively read from or write into a specified range of physical addresses. FIG. 7 illustrates an example decision process implemented by the transaction execution manager 201 of FIG. 5 to exclude from transactional treatment loads and stores that are associated with the specified range of physical addresses 212 of FIG. 5. Referring to FIG. 7, the example transaction execution manager 201 accesses a load instruction(s) 241 and/or a store instruction(s) 243 that is/are found by the transaction excluder 206 to be referencing such a specified physical address range. The example transaction execution manager 201 determines whether the load instruction 241 and/or the store instruction 243 that is/are tracked by the transaction manager 205 will be treated as a non-transactional access or a transactional access based on the corresponding address(es) (e.g., based on whether the address(es) is/are in the range of physical address(es) that is/are specified to be excluded). In the illustrated example of FIG. 7, the load instruction 241 and/or the store instruction 243 corresponding to an address(es) not in the excluded range 212 (FIG. 5) is/are treated as transactional 245. Alternately, the load instruction 241 and/or store instruction 243 corresponding to an address(es) in the excluded range is/are treated as non-transactional 247. Other instructions such as (e.g., non-temporal LOADS and STORES (MOVNT), CLWB and CLFLUSH are allowed on this excluded range of physical addresses). In some examples, the decision process can be implemented using hardware components that compare the addresses of incoming loads and stores with the excluded range of physical addresses. In other examples, the decision process of FIG. 7 can be implemented in any other manner that is suitable. Significantly, in some examples, because such exclusion is pre-specified and refers to a range of physical memory disjoint from the remaining physical memory over which TSX applies, the exclusion technique is not burdensome as is described hereinabove.

Referring again to FIG. 5, transaction execution manager 201 uses the excluded loads and stores to create durable log entries in the NVM 207. In addition, transaction execution manager 201 uses the durable log entries to log transactions in a manner that sets an unambiguous order among transaction logs and to distinguish transactions by status tags/markers. In the illustrated example of FIG. 5, the example counter 201a, the example state tracker 201b and the example time value token provider 201c enable the transaction execution manager 201 to determine an unambiguous order among transaction logs and to distinguish transactions by status tags/markers. In particular, each transaction is provided with a status tag/marker. Example operations of these components are described in detail below in reference to FIG. 11.

Machine crashes, unexpected loss of power, and/or other device malfunctions can result in aborted transactions and uncertainties related to whether ongoing transactions completed before such unexpected events. In response to such transaction completion uncertainty, the example transaction execution manager 201 uses the transaction log order determined by the counters 201a, the state tracker 201b and the time value token provider 201c to perform the following recovery actions following a machine crash or general hardware or software failure that disrupts the operations of a computer: (1) identify a first transaction T1 that recorded a COMMIT tag/marker but failed to record a CONFIRM tag/marker, (2) undo transactions in reverse time order starting at a last transaction T2 that recorded a COMMIT tag/markerup to and including the first transaction T1 and (3) redo transactions in forward time order from a sequentially first transaction T0 that is identified periodically, up to, but not including transaction T1. In this manner, examples disclosed herein substantially decrease or eliminate occurrences of data corruption by recovering previously stored data associated with transactions that both completed and confirmed completion.

Figure 8:
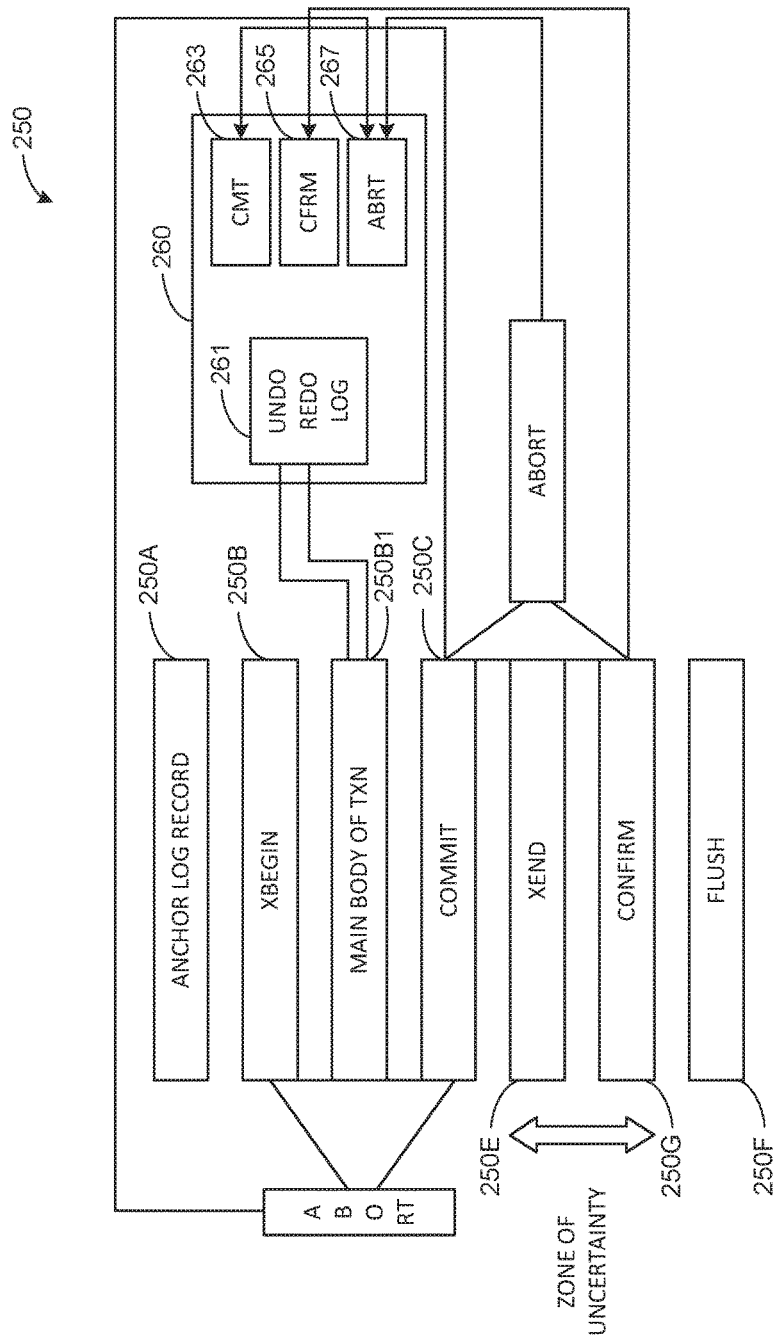
FIG. 8 illustrates an example process that may be performed to implement an example TSX transaction in accordance with the teachings of this disclosure.

FIG. 8 illustrates an example process that may be performed by the transaction execution manager 201 of FIG. 5 to manage execution of an example TSX transaction 250 (e.g., the TSX operation 220 of FIG. 6) in a manner such that previous data can be recovered in accordance with the teachings of this disclosure should the TSX transaction 250 be aborted before finishing. In the illustrated example of FIG. 8, the example, transaction execution manager 201 uses the above-described excluded range of physical addresses 212 (FIG. 5) (hereinafter "TRF" for transferred range filtering) to track changes from each example TSX transaction with log entries in an UNDO-and-REDO log 261. In the illustrated example, transaction log records in the UNDO/REDO log 261 do not cause data race conditions because each transaction log record is accessed from one thread for a given transaction. An anchor log record 250 is the first log record to be associated with a transaction. In some examples, the anchor log record 250A is a log record sequence identifier as determined by a counter that is associated with the transaction. The anchor log enables the establishment of a sequential order among transaction logs in the TRF log buffer. This enables the earliest sequenced log record after uncertainty (and the earliest sequenced log record to be used in the recovery phase) to be readily identified.

In some examples, transactions that visibly complete are logged with a COMMIT tag/marker 263 and a CONFIRM tag/marker 265. Those that visibly abort are logged with an ABRT tag/marker 267. At recovery time, a transaction log record that has no tags/markers, or only an ABRT tag/marker 267, can be discarded. In some examples, transaction log records are arranged in time order of their COMMIT tag/marker so that the order in which transactions completed, and the changes that the transactions made to data in NVM (e.g., the NVM 207 in FIG. 5) is known at recovery time (even if data changes had not been flushed to the NVM 207 in a timely fashion before the point of an unexpected system failure). This decreases or eliminates uncertainty regarding data integrity to transactions with a COMMIT tag/marker 263 and no CONFIRM tag/marker 265 in their log records. In this manner, the transaction execution manager 201 can recover a fully consistent NVM state (e.g., an NVM state of which data integrity is preserved) up to the first transaction (in time order) that was committed but failed to record either a CONFIRM tag/marker 265 or an ABRT tag/marker 267 due to a machine failure interruption. Thus, the example transaction execution manager 201 enables consistency and recovery up to a last known good point of prior instability (e.g., the last transaction which failed to record that it successfully processed an XEND instruction). These features enable the transaction execution manager 201 to address data integrity related ambiguities that can arise when a machine fails and a prior TSX transaction 170 being executed is abruptly aborted.

As shown in the illustrated example of FIG. 8, differences between the prior TSX transaction 170 of FIG. 4 and the example TSX transaction 250 of FIG. 8 (e.g., 220 of FIG. 6) are that the example TSX transaction 250 includes a CONFIRM operation 250G (e.g., 220F in FIG. 6) that is located between an XEND operation 250 (e.g., 220E in FIG. 6) and a FLUSH operation 250F (e.g., 220D3 in FIG. 6).

The operations described with reference to FIG. 8 address ambiguities that can arise with prior TSX transactions when machine failures occur either: (a) between the end of durably writing a commit flag (e.g., the durably write commit flag operation 170D1 of FIG. 4) in the transaction log record and the end of flushing values (e.g., the flush operation 170D3 in FIG. 4) to NVM, or (b) after a TSX abort, following durably writing a COMMIT tag/marker (e.g., the durably write commit flag operation 170D1 of FIG. 4), but before the COMMIT is de-committed (e.g., when a previously logged COMMIT tag/marker is withdrawn or removed from a log entry because a previous state of the data is required, such as after a TSX abort). Scenarios such as (a) and (b) make it difficult to rely on the COMMIT tag/marker state in the transaction log record when conducting recovery operations. The example transaction execution manager 201 of FIG. 5, addresses such scenarios by utilizing transaction order tracking and state tracking that facilitates the arrangement of transaction logs in an unambiguous order and enables the first unreliable transaction in the unambiguously ordered transaction logs to be readily identified. Thus, transactions that have a COMMIT time after this transaction can be countermanded (e.g., undone). Conversely, transactions that have a COMMIT time prior to this transaction can be safely redone. The example XBEGIN operation 250B of FIG. 8 operates in a substantially similar or identical way to the example XBEGIN operation 220A of FIG. 6. In addition, the example XEND operation 250B1 of FIG. 8 operates in a substantially similar or identical way as the XEND operation 220E of FIG. 6.

In addition, the example transaction execution manager 201 addresses situations where a very strong guarantee regarding the reduction or elimination of side effects (e.g., network messages sent after XEND that indicate committed and confirmed transactions) from transactions that execute a CONFIRM instruction but are logged in a commit time order after some transaction that did not execute a CONFIRM instruction (a confirm marker/tag was not written into the transaction log record for the transaction). To provide such strong assurances regarding side effect reduction or elimination, in one example, the transaction execution manager 201 delays side effects by using a micro-batching time window on the order of a few microseconds. In another example, the transaction execution manager 201 uses pseudo-synchronization variables (as opposed to locks) in XEND instruction processing. Transactions process XEND instructions in COMMIT time order with their sequence being identified by the pseudo-synchronization variable. This avoids any interference with the main body of the transaction, and facilitates the placing of CONFIRM logs in COMMIT time order. This process is described in detail herein below in connection with FIG. 13.

Referring again to the illustrated example of FIG. 5, the NVM 207 stores data until it is deleted or overwritten. In some examples, data updates resulting in cache line modifications are flushed to the NVM 207 from the cache 203 of the CPU 204 after XEND instructions are executed by the CPU 204 (see FIG. 5). If a transaction successfully commits, the transaction execution manager 201 stores the result in the NVM 207. If the transaction does not successfully commit, the transaction execution manager 201 does not store the result in NVM 207, and it appears as if the non-committed transaction never took place.

For example, if a transaction causes a value X in cache to change from 0 to 1, after a short period of delay D, the value is assured to be updated in NVM 207 (either directly or via log replay). This is because, in some examples, the delay D allows the transaction log record that corresponds to the change of the value from 0 to 1 to be flushed to NVM 207. In some examples, the delay D is equal to the delay between COMMIT and CONFIRM operations. In such examples, transaction log records are durably committed (remain committed even in the event of power loss, crashes, or errors) in the NVM 207 in association with corresponding COMMIT and CONFIRM operations.

In some examples, the timing of the flushing of logs to the NVM 207 is synchronized with the flushing or writing back of corresponding data to the NVM 207. For example, when a transaction is executed, the transaction log record for the transaction is flushed to NVM 207 first, and subsequently any data changed by the transaction is flushed to the NVM 207. Accordingly, in some examples, should a machine executing the transaction crash after the transaction log record is flushed to NVM 207, post-transactional values logged prior to the crash can be restored from the logs flushed to NVM 207. Moreover, in some examples, should the machine crash before the transaction log record is flushed to NVM 207, the data state of the target data remains unchanged because changes to the data are stored in temporary alternative locations up to the point that the transaction log record for the transaction is flushed to NVM 207.

The example cache 203 of FIG. 5 can be integrated with the CPU 205. In some examples, the cache 203 is the primary cache of the CPU 205. In some examples, cache lines of the cache 203 are modified as a part of transactional accesses (e.g., accesses that either complete or abort) to the cache 203. In some examples, data updates are flushed to the NVM 207 from the cache 203 after the CPU 205 executes XEND instructions. In some examples, cache lines modified inside an atomic region (e.g., in a region of code that must all execute or be aborted) become globally observable at the same time.

Operation

FIGS. 9 and 11-13 illustrate operations that may be performed by a transaction execution manager (e.g., 201 in FIG. 5) to implement transaction execution atomicity in NVM used for hardware transactional memory in accordance with teachings of this disclosure. The operations of FIGS. 9 and 11-13 are disclosed by way of example for implementing such transaction execution atomicity. It should be appreciated that other operations not illustrated in FIGS. 9 and 11-13 can additionally or alternatively be performed in accordance with the teachings of this disclosure.

Figure 9:
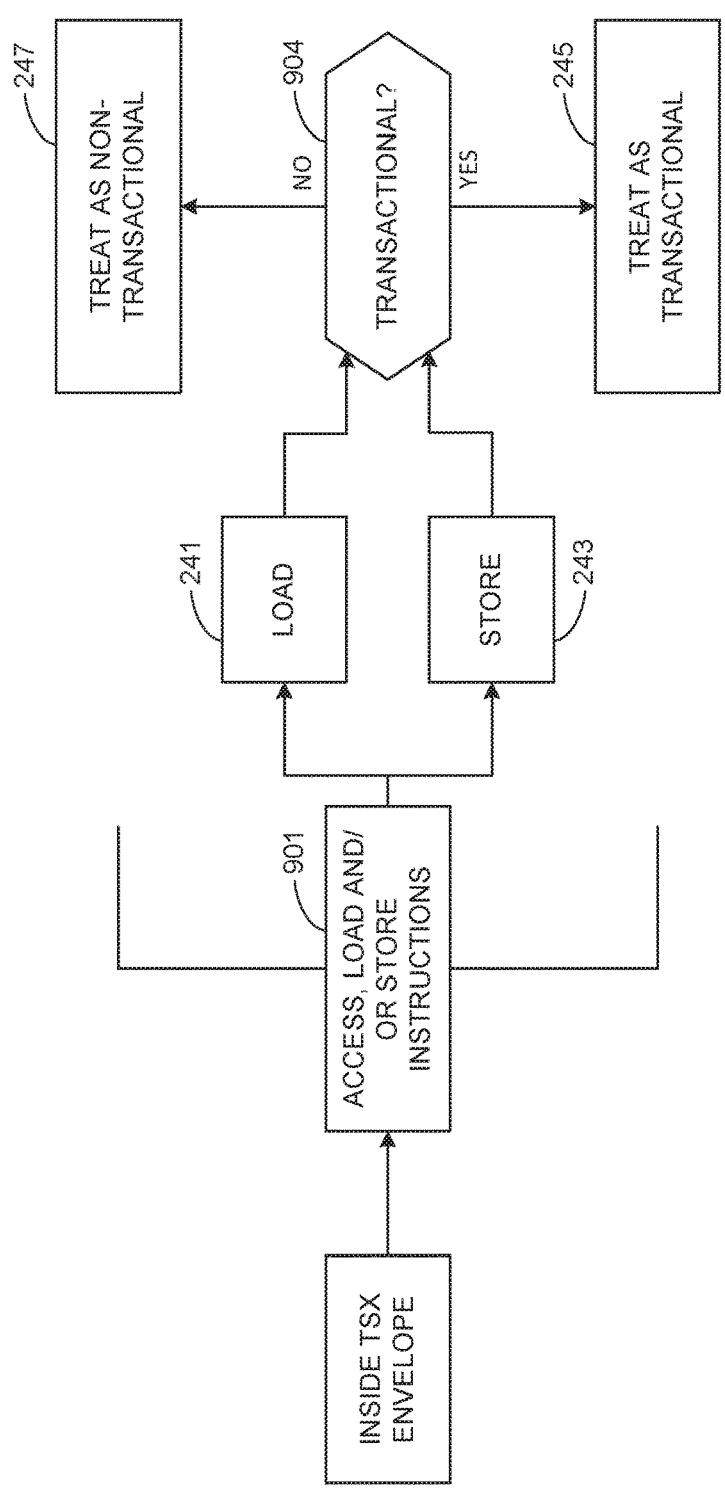
FIG. 9 illustrates an example decision process implemented to execute loads and stores that are associated with a specified range of physical addresses from a range of serialized code that is tracked by the transaction manager of FIG. 5.

FIG. 9 illustrates an example process to exclude loads and stores that are associated with an excluded range of physical addresses from transactional treatment. In the illustrated example, the transaction manager 205 of FIG. 5 accesses load and store instructions (block 301) from a range of TSX transaction serialized code body (e.g., a collection of instructions to execute a transaction) and hides modifications to memory locations made by those instructions until execution reaches the end of that TSX transaction serialized code body. In this manner, the data modified by the TSX transaction is not globally visible to other processes until the TSX transaction is finished executing in its entirety. To enable tracking of TSX transactions using the example process of FIG. 9, the transaction excluder 206 of the transaction execution manager 201 of FIG. 5 implements a TSX transaction address range filter (TRF) by excluding load and store instructions that are to access a range of physical addresses in the NVM memory 207 that are identified in the excluded address register 208 (FIG. 5). That is, physical addresses in the excluded address register 208 are excluded from being accessed by transactions tracked by the transaction manager 205.

In addition, the example transaction excluder 206 determines whether the load instruction 241 and/or the store instruction 243 is/are to be treated as transactional accesses (block 904). For example, the transaction excluder 206 uses the memory address locations that will be accessed by those instructions 241, 243 to determine whether to treat them as non-transactional or transactional (e.g., based on whether the addresses are in the range of physical addresses specified in the excluded addresses register 208 of FIG. 5). In the illustrated example of FIG. 9, load instructions (e.g., the load instruction 241) and/or store instructions (e.g., the store instruction 243) that do not access memory addresses identified in the excluded addresses register 208 are treated as transactional (block 245). Otherwise, load instructions (e.g., the load instruction 241) and/or store instructions (e.g., the store instruction 243) with addresses in the excluded address register 208 are treated as non-transactional (block 247), and non-temporal writes, CLWB instructions and CLFLUSH instructions are allowed on this range of loads and stores. In some examples, software can be used to automate the specification of the TRF range upon which exclusion of the load instruction 241 and/or the store instruction 243 is/are based. Moreover, various techniques can be used to specify the TRF range including, for example, dedicated model specific-registers (MSRs) that are set up globally from an application, or by the use of instructions that convey the filtered range to a TSX state machine.

In some examples, a page of substantial size, e.g., 1 GB, or any other size, can be used to store the loads and stores (accesses) to the TRF range. The physical address and size of the page are stored in the excluded address register 208. Excluded address register 208 is a special register that the transaction execution manager 201 can quickly access in order to identify excluded addresses and determine what action to take (exclude or not exclude) with regard to loads and stores of the above described serialized code body. In some examples, the address range filtering is specified per process, where each thread has the same TRF address range. TRF stores can be flushed from caches, written to non-volatile memory, etc., without breaking TSX protocol (which may not allow such operations). In some examples, because of this, a programmer can optionally use CLWB instructions, MOVNT instructions, etc., on such transactions, as TSX is not concerned with detecting races with regard to these transactions. In examples disclosed herein, this TRF address range is used to make log entries in the NVM 207 that will survive a machine crash. Such log entries can be used during a restart to restore data back to a valid state. For example, recovery code (e.g., ARIES protocol) can use such log entries, during a restart to determine how other locations in the NVM 207 are to be updated/restored following the machine crash. This TRF address range is also used for intra-thread signaling. For example, through the flushing of the transaction log records that are stored in this range to the NVM 207, a thread identifies, to itself, the cache lines that it has modified. In addition, the TRF address range contains COMMIT, CONFIRM and ABORT markers/flags that record the state of a transaction even if the transaction aborts (in prior TSX transactions an ABORT operation results in a restoral of a memory state to what it was at the beginning of the transaction). In some examples, the loads and stores into the TRF address range contain metadata such as logs and COMMIT/ABORT/CONFIRM markers/flags, etc. This information serves as a rolling record of what is intended to be written into the NVM 207 by transactions. This information is stored in the TRF address range until it is confirmed that the transactions are reflected in updates to the NVM 207. In some examples, confirmation may be automatically implemented by a FLUSH operation which ensures that all transaction log records stored in the TRF address range at the time of the FLUSH operation are written to the NVM 207. In addition, in some examples, an SFENCE instruction is issued every 100 ms. In other examples, SFENCE instructions are issued with another periodicity. In some examples, log records can be maintained for two such periods after being flushed to the NVM 207. In other examples, log records can be maintained for other lengths of time. In addition, in some examples, XEND operations (or XRELEASE operations) are caused to wait implicitly for stores to the TRF address range to be retired (i.e., the XEND operation is an implicit SFENCE operation in that all stores that proceed the XEND operation are retired before stores that follow the XEND operation). Alternatively, an SFENCE instruction is allowed inside a TSX body with implication that it applies to STORE, CLWB, MOVNT instructions over locations in the TRF address range that are issued before the SFENCE instruction. In some examples, hardware can be used for TSX enforcement. In other examples, another manner of implementing TSX enforcement can be used. In one example, hardware may not be used to create any state or to determine intersections between speculative and non-speculative accesses.

Figure 11:
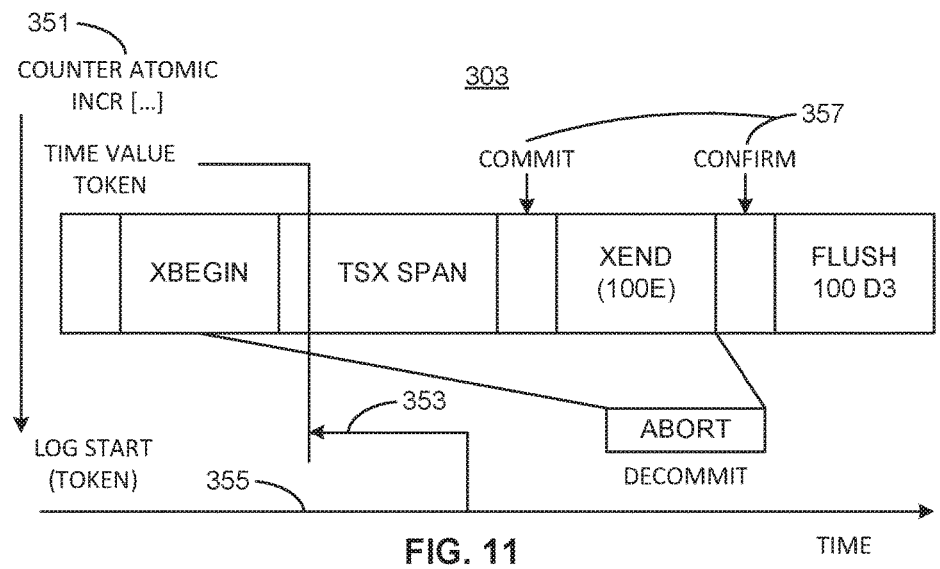
FIG. 11 illustrates an example sequence of operations to execute the example transaction of FIG. 6 and example techniques to order transaction logs and to distinguish between different transactions in accordance with the teachings of this disclosure.
Figure 10:
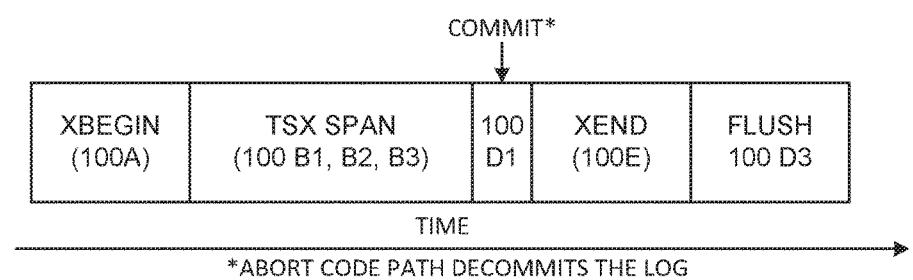
FIG. 10 shows a sequence of operations to execute the prior transaction of FIG. 4.

In the illustrated example of FIG. 11, at 303, the example transaction execution manager 201 (FIG. 5) uses tracking to track the order of transaction logs and to distinguish between transactions that execute an XEND instruction and are untracked by logs thereafter and other transactions. In some examples the transaction execution manager 201 eliminates ambiguity related to the transactions that execute an XEND instruction and are untracked by logs thereafter and other transactions. Example TSX transaction shown in FIG. 11 can be contrasted with the prior TSX transaction shown in FIG. 10 which lacks transaction order and state tracking mechanisms such as the monotonic counter, time value token provider and state tracker shown in FIG. 5 that are used in conjunction with the execution of the example transaction shown in FIG. 11.

In some examples, as shown in FIG. 11, transaction execution manager 201 utilizes a monotonic counter (201*a* in FIG. 5) which is incremented at 351, a time value token provider (201*c* in FIG. 5) to instantiate time value tokens at 353, time ordered log records with time order shown at 355, and a state tracker (201*b* in FIG. 5) that provides state tags/flags/markers 357 (e.g., COMMIT, CONFIRM and ABORT) to track the order of transaction logs and to distinguish between transactions that execute an XEND instruction and are untracked by logs thereafter, and other transactions. For example, before the XBEGIN instruction is executed, the monotonic counter (201*a* in FIG. 5) is incremented 351 (using an INCR instruction). In one example, this incrementing of the monotonic counter is used to give the transaction log record that is associated with the transaction an identifier that indicates its sequence in a sequenced log record of transactions that are stored in a TRF transaction log buffer (e.g., TRF LOG area 260 of FIG. 8). Shortly after the XBEGIN operation, a time value "token" is written 353 into the transaction log buffer that associates a time with the transaction that has just executed the XBEGIN instruction. In one example, based on the time value tokens (written into the transaction log buffer at 353), transaction log records for transactions that have executed an XBEGIN instruction but not an XEND instruction can be placed in time order. In one example, any ambiguity in this order is for transactions that are not aborted. Moreover, because such transactions do not intersect on data (do not access the same data), ordering ambiguity with regard to them is acceptable.

In addition, referring to FIG. 11, the transaction execution manager 201, records a CONFIRM flag following an XEND instruction and before a FLUSH instruction. For example, state tracker 201*b* causes the adding of a confirm marker to the transaction log records that indicates that a transaction has been confirmed as committed. In the illustrated example, the transaction execution manager 201 uses the counter increments 351, the time value tokens 353 and the CONFIRM tag/flag/marker 357 to establish an unambiguous order among transaction log records which enables the transaction execution manager 201 to distinguish between transactions that execute an XEND instruction and thereafter are untracked by logs, and other transactions. In some examples, in this manner ambiguity regarding the order in which transactions complete upon machine failure is addressed.

The transaction tracking system executed by the transaction execution manager 201 at 303 limits the zone of transaction failure. That zone is then addressed by the recovery protocol that is described with reference to operation 305 below.

Figure 12:
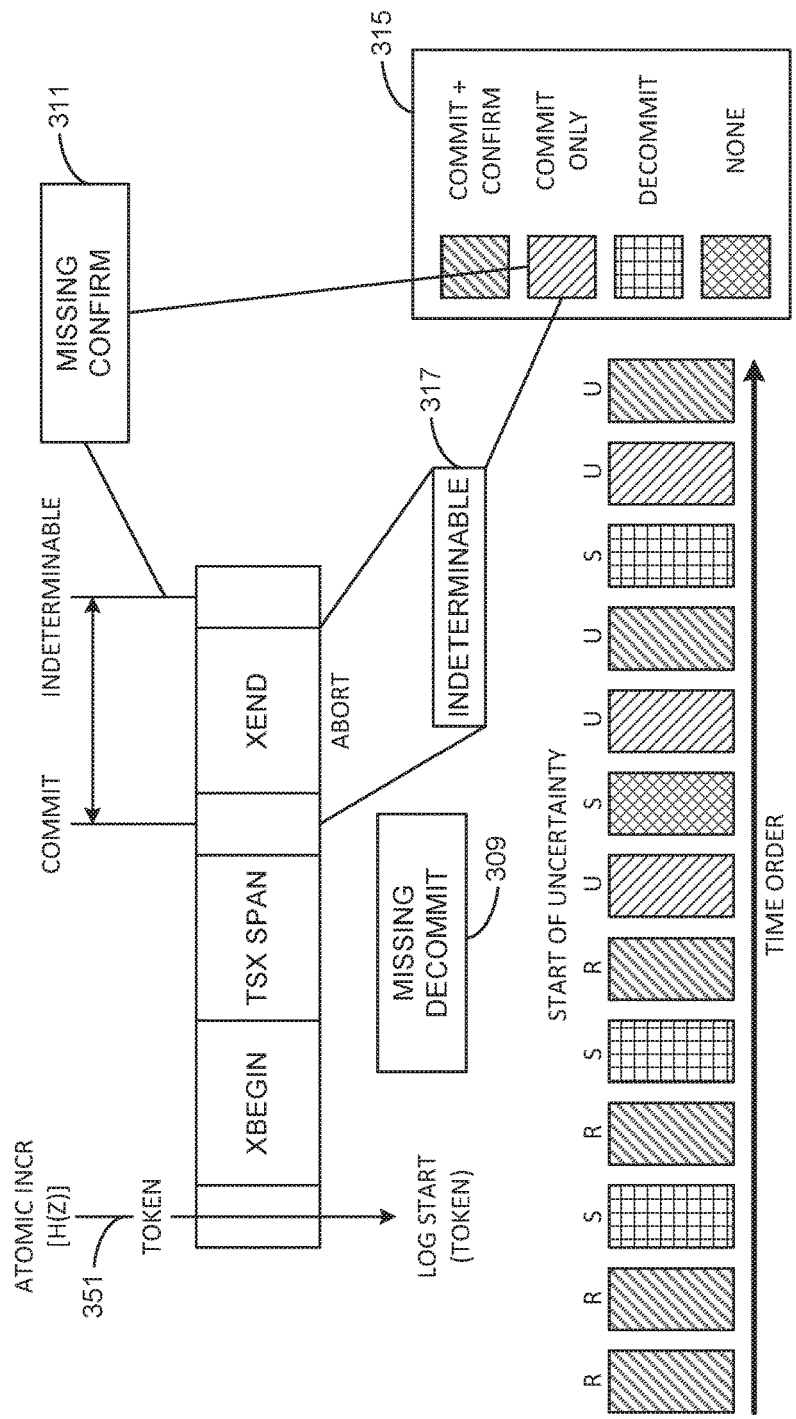
FIG. 12 shows an example of ordering transactions in accordance with this disclosure.

FIG. 12 shows (with respect to reproduced portions of FIG. 11 at top) example states of a transaction log record after a machine failure. Referring to FIG. 12, at right, the possible states for a transaction as shown in the transaction COMMIT/CONFIRM status key 315 are: (a) has executed both a COMMIT instruction and a CONFIRM instruction (successful), (b) has executed a COMMIT instruction alone as its last known state (ambiguous), (c) has executed a DECOMMIT instruction (e.g., transaction known to have entered an ABORT path, an), (d) has not executed a COMMIT instruction (unsuccessful). In case (b), the fate of a transaction may be indeterminable because the transaction could have either began but not completed executing an XEND instruction, or could have completed executing the XEND instruction but not managed to perform the CONFIRM operation, or could have received a transaction abort due to a resource conflict between when it completed the COMMIT instruction but before it could complete executing the XEND instruction (e.g., there is a missing log record of the execution of a DECOMMIT instruction 309 to undo the execution of a COMMIT instruction that would indicate an ABORT condition; and a missing log record of the execution of a CONFIRM instruction 311 that would indicate that an XEND instruction has been executed). This area of ambiguity is addressed by a tailored recovery approach that is described in detail below with regard to 305. It should be appreciated that in some examples, the first transaction that logs a COMMIT tag/marker but no CONFIRM tag/marker is identified as the first transaction that may have made changes to data that are not reliably valid. As such, this transaction and the transactions that follow it are discarded.

Figure 13:
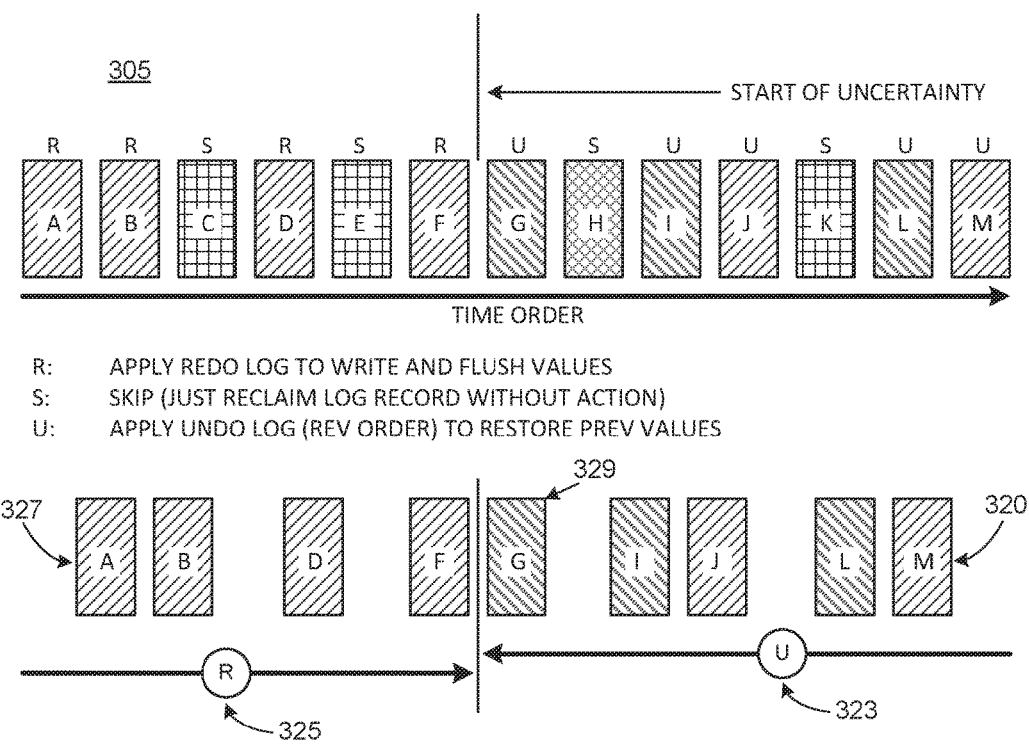
FIG. 13 illustrates an example recovery response to transaction completion uncertainty.

At 305, as shown in FIG. 13, transaction execution manager 201, as a recovery response to transaction completion uncertainty, undoes 323 transactions 320 up to and including the first transaction 329 with a COMMIT log marker and no CONFIRM log marker in reverse time order and redoes 325 transactions 327 up to (and not including) the start of the first transaction 329 with a COMMIT log marker and no CONFIRM log marker in forward time order (transactions that occur before the transaction 329). Referring to FIG. 13, at top, there is shown a number of transactions (a, b, c, m), that are ordered by timestamps (using time value tokens 353 in FIG. 11) in their records (see status key from FIG. 12). Among these, transactions a, b, d, f, j and m are indicated to have recorded both a COMMIT log marker and a CONFIRM log marker, and transactions g, i, and l are indicated to have recorded only a COMMIT log marker for their last known state. The changes made by these transactions are partially released into cache hierarchy and from there into the NVM 207, but it may not be known if they executed an XEND instruction or were aborted. Transactions c, e and k recorded a DECOMMIT log marker and thus are reliably known to have aborted. Transaction h did not execute a COMMIT instruction.

Figure 14:
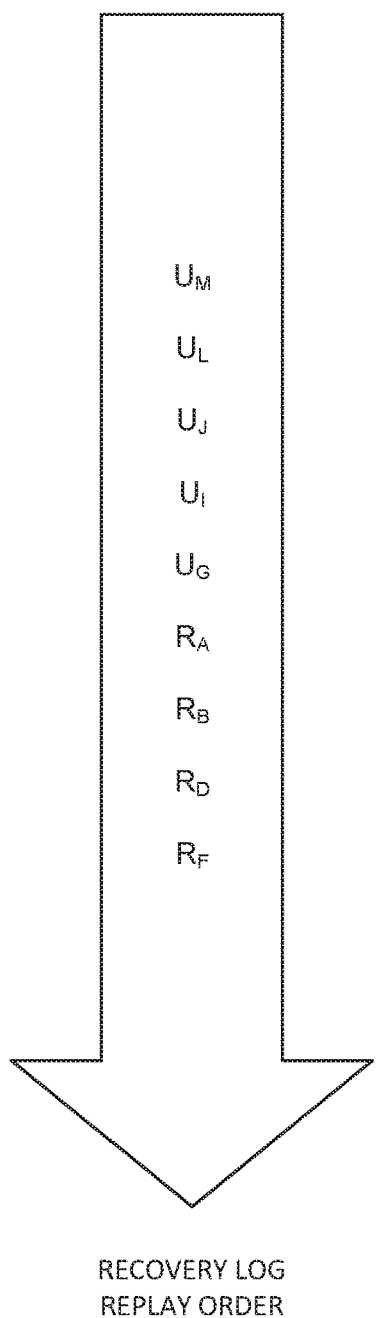
FIG. 14 shows an example recovery log replay order of transactions of FIG. 13.

In the illustrated example, transaction execution manager 201 handles log records for c, e, k, and h, which are known to have aborted, in a straightforward manner as described below. These transactions reliably produced no change in data values. In FIG. 12 these transactions are labeled "S" to indicate log records that can be skipped. Regarding the remaining transactions, g is the first to record a COMMIT log marker without recording a CONFIRM (nor DECOMMIT) log marker. In one example, the transaction execution manager 201 recovers the NVM 207 state up to the start of g as follows. Skipping S records, the transaction execution manager 201 plays the UNDO log in reverse time order up to g. For example, the UNDO actions are performed in the order m, l, j, i, g, to correct the memory state for operands associated with these transactions that were read and modified. Next, the possibility that durable commits into NVM were missed for any values modified in a, b, d, and f (which were correctly written to caches but not necessarily written into NVM), is addressed. The transaction execution manager 201 utilizes a procedure that addresses the possibility that durable commits to NVM for a, b, d, and f may have been missed by committing these values into NVM based on the time ordered REDO logs for a, b, d and f FIG. 14 shows the complete recovery log replay order for transactions 320 and 327 (FIG. 13). In some examples, for purposes of recovery, in order to designate a start time for transaction a, an appropriate one of the periodic points (e.g., once every few seconds) in code at which new transactions are held up from starting, and all pending writes to NVM, e.g., NVM 207 in FIG. 5, (e.g., data values) are allowed to complete, can be designated at the start time. In other examples, other manners of determining the start sequences for future recovery can be used.

In some examples, in an environment that includes a plurality of CPUs, each CPU can pause on a rolling basis and the transaction execution manager 201 can maintain a rolling marker for the point at which each CPU is caused to pause. Note that any context switch, interrupt, etc. is essentially an SFENCE instruction point within a CPU, this is similar to an algorithm that remembers the last time that each of the CPUs performed at least one switch.

Conciliating Residual Side Effects

In some examples, the transaction execution manager 201 provides consistency up to the end of last known successfully completing transaction that crossed the window of vulnerability between the execution of a COMMIT instruction and the execution of an XEND instruction. In some examples, it is possible for a transaction to execute a COMMIT instruction and a CONFIRM instruction but be in a COMMIT time order (order of COMMIT log markers) behind a non-confirming transaction. Transactions j and m in the example of FIG. 13 meet this description (although in one example this would be a rare case). If their REDO logs are replayed to move the NVM state forward to include them as successful, a risk of inconsistency is posed, since they could have received and used values changed by transaction g (or any other transaction like g whose validity is uncertain). Thus, log records for j and m cannot be known to be free from contamination. Moreover, j and m could have irrevocable side effects. Accordingly, if j and m are dropped because of risk of inconsistency, then measures should be taken to prevent their side effects.

In some examples, to prevent the side effects of transactions that commit and confirm after a first transaction that commits but does not confirm, a multi-microsecond gap can be placed between a COMMIT operation and any side effect, by convention, e.g., the side effect is delayed by the multi-microsecond gap. In some examples, the period can include a determined maximum period that it takes for a transaction to execute a CONFIRM instruction after having executed a COMMIT instruction. In some examples, the gap can be several orders of magnitude larger than the period necessary to allow the execution of XEND and CONFIRM instructions (after the execution of a COMMIT instruction). In some examples, transactions read a known address after executing a COMMIT instruction and before executing an XEND instruction. Periodically a thread writes to that known address. The writing by the thread to that address causes the immediate aborting of any transaction that has not executed an XEND instruction. Thus, any transactions that experience excessive delay in executing an XEND instruction after executing a COMMIT instruction are reliably known to have been aborted, if they have not performed a CONFIRM operation in that period of time. Accordingly, if side effects of transaction are delayed by the aforementioned period those side effects will be reliably known to not have been performed before the corresponding transaction is aborted. In some examples, any code performing a side effect operation can check that the COMMIT timestamp for a corresponding transaction is at least as far back in time as two of these periods. In this manner, it can be determined that there is not an older transaction than the corresponding transaction that has yet to execute a CONFIRM or an ABORT instruction.

In other examples, to prevent the side effects of transactions that execute a COMMIT instruction and a CONFIRM instruction after a first transaction that executes a COMMIT instruction but does not execute a CONFIRM instruction, the transaction execution manager 201 ensures that transactions execute XEND instructions in COMMIT order. In some examples, this is accomplished using a COMMIT operation sequence number as a counter to verify the order of a transaction after it executes an XEND instruction. Thus, in some examples, while example TSX transactions (e.g., the transaction 220 in FIG. 6) can execute in parallel, they complete in the order of their COMMITs. In some examples, to achieve further parallelism, transactions may use separate counters (multiple counter queues). In such cases, the counters essentially act as exclusion sets (that define non-intersecting critical regions). This approach provides serialization of transactions between the execution of XEND instructions and the execution of CONFIRM instructions.

In some examples, if side effects are limited to those associated with transactions that are committed in durable state in NVM the above approaches to addressing side effects are unnecessary because the unpredictable machine failure that caused g (in the illustrated example of FIG. 13) to execute a COMMIT instruction but not execute a CONFIRM instruction but allowed j and m to execute both COMMIT and CONFIRM instructions, could have happened a few moments earlier or later and the outcome would have arbitrarily produced a different point of uncertainty. Thus, different usages may involve different levels of strictness or adjustment with regard to residual side effects depending on requirements for causal order (just as databases have different isolation levels).

Figure 15:
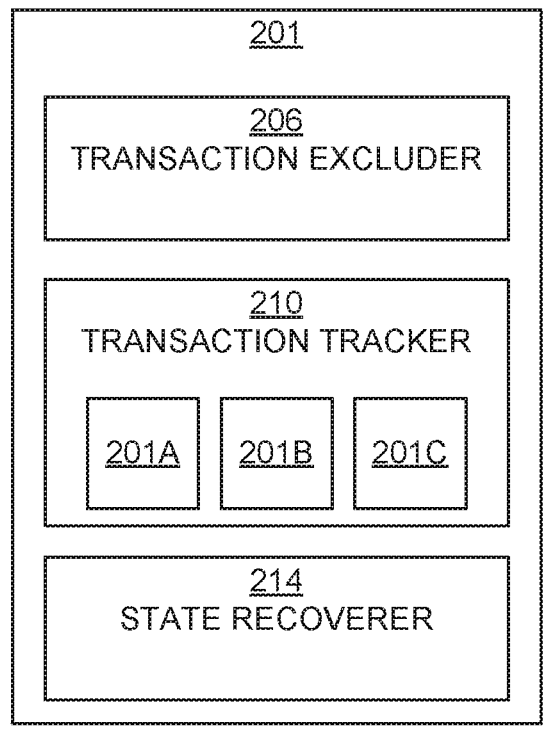
FIG. 15 shows an example apparatus to provide atomicity in nonvolatile memory (NVM) in hardware transactional memory in accordance with the teachings of this disclosure.

FIG. 15 shows an example of the transaction execution manager 201 to implement transaction execution atomicity in the hardware transactional memory (211 in FIG. 5) located in the NVM 207 of FIG. 5. Components of transaction execution manager 201 shown in FIG. 15 include an example transaction excluder 206, an example transaction tracker 210 and an example state recoverer 214.

The example, transaction excluder 206 excludes loads and stores to a range of physical addresses from a range of serialized code body of which transactions are tracked. Effectively, any load or store in this range becomes a non-transactional (i.e., non-speculative) access (see description of FIG. 7). In some disclosed examples, a substantial page size, e.g., 1 GB, can be used to store the TRF ranges so that they are compactly represented and accessed by a compact address translation entry. In other examples, other suitable page sizes can be used. In some examples, the physical address and size of this space can be placed in a specified register (e.g., the excluded address register 208 in FIG. 5) to assist a transaction execution manager to quickly determine the action to take with regard to a load or a store (exclude or not exclude the load or store transactions).

The example, transaction tracker 210 tracks transactions that are a part of the range of serialized code. In some examples, transaction tracker 210 includes monotonic counter 201a, transaction state tracker 201b and time value token provider 201c. In some examples, as part of the tracking, the transaction tracker 210 tracks both the order and the state (e.g., committed, aborted, confirmed) of such transactions. For example, the transaction tracker 210 tracks the order and the state of such transactions utilizing monotonic counters (to provide transactions a sequence identifier), time value tokens, time ordered log records, and status tags/markers. In some examples, the monotonic counter 201a is used to create a sequenced log record in a TRF-based log buffer where transaction log records are stored with a sequence identifier. Shortly after an XBEGIN operation, the example time value token provider 201c provides a time value "token" to write into the log buffer. Using the time value "token" log records are written into the transaction log record in time order, the corresponding transaction having executed an XBEGIN instruction but not an XEND instruction. In some examples, any ambiguity in this order is for transactions that are not aborted. Because such transactions do not intersect on data (e.g., because such transactions do not access the same data), ordering ambiguity with regard to them is acceptable. In addition, the transaction tracker 210 uses the transaction state tracker 201b to cause the addition of a CONFIRM flag in the transaction log record (e.g., before FLUSH) when the first instruction following the XEND instruction is executed. In this manner, transaction tracker 210 not only establishes an unambiguous order among transaction logs but distinguishes between transactions that only commit and those that commit and confirm. Consequently, transaction tracking mechanisms of transaction tracker 210 such as the monotonic counter 201a, the state tracker 201b (which provides status tags/markers), and the time value token provider 201c (which provides time value tokens) enable the determination of time ordered log records and to distinguish transactions that execute an XEND instruction and are thereafter untracked by transaction logs (transactions that COMMIT only), from other transactions (transactions that COMMIT and CONFIRM, ABORT). As such, the first transaction whose validity cannot be assured (the first transaction with a COMMIT tag/marker only) can be readily identified.

The state recoverer 214 in response to transaction completion uncertainty, during a recovery operation, (1) identifies a first transaction T1 (e.g., G in FIG. 13) that recorded a COMMIT tag/marker but failed to record a CONFIRM tag/marker, (2) undoes transactions in reverse time order starting at a last transaction T2 (e.g., M in FIG. 13) that recorded a COMMIT tag/marker up to and including the first transaction T1 and (3) redoes transactions in forward time order from a sequentially first transaction T0 (e.g., A in FIG. 13) that is identified periodically, up to, but not including transaction T1. The state recoverer 214 continues the recovery procedure by committing recovered values into the NVM from the REDO logs. As a part of these operations, the state recoverer 214 identifies the first transaction to be recovered (e.g., transaction A in FIG. 13), by determining periodic points (e.g., once every few seconds) at which new transactions are held up from starting and pending writes to NVM (e.g., data values) are allowed to drain. In some examples, state recoverer 214 uses a corresponding such point to identify the first transaction to be recovered (the first transaction occurring after such point).

It should be appreciated that the aforementioned components of the transaction execution manager 201 for transaction execution atomicity under NVM in hardware transactional memory can be implemented in hardware or software or in a combination of both. In some examples, components and operations of transaction execution manager 201 for transaction execution atomicity in NVM under hardware transactional memory can be encompassed by components and operations of one or more computer components. In other examples, components and operations of the transaction execution manager 201 for transaction execution atomicity in NVM under hardware transactional memory can be separate from the aforementioned one or more computer components but can operate cooperatively with such.

While an example manner of implementing the transaction execution manager 201 for transaction execution atomicity in NVM in hardware transactional memory of FIG. 5 is illustrated in FIG. 15, one or more of the elements, processes and/or devices illustrated in FIG. 15 may be combined, divided, re-arranged, omitted, eliminated and/or implemented in any other ways. Further, the example transaction excluder 206, transaction tracker 210 (including monotonic counter 201a, state tracker 201b and time value token provider 201c), and state recoverer 214 and/or, more generally, the example transaction execution manager 201 for transaction execution atomicity in NVM under hardware transactional memory of FIG. 5 may be implemented by hardware, software, firmware and/or any combination of hardware, software and/or firmware. Thus, for example, any of the example components of the transaction execution manager 201 for transaction execution atomicity in NVM under hardware transactional memory and/or, more generally, the transaction execution manager 201 for transaction execution atomicity in NVM under hardware transactional memory could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, transaction excluder 206, transaction tracker 210 (including monotonic counter 201a, transaction state tracker 201b and time value token provider 201c), and state recoverer 214 is/are hereby expressly defined to include a tangible computer readable storage device or storage disk such as a memory, a digital versatile disk (DVD), a compact disk (CD), a Blu-ray disk, etc. storing the software and/or firmware. Further still, the example transaction execution manager 201 for transaction execution atomicity in NVM under hardware transactional memory of FIG. 5 may include one or more elements, processes and/or devices in addition to, or instead of, those illustrated in FIG. 15, and/or may include more than one of any or all of the illustrated elements, processes and devices.

Figure 16A:
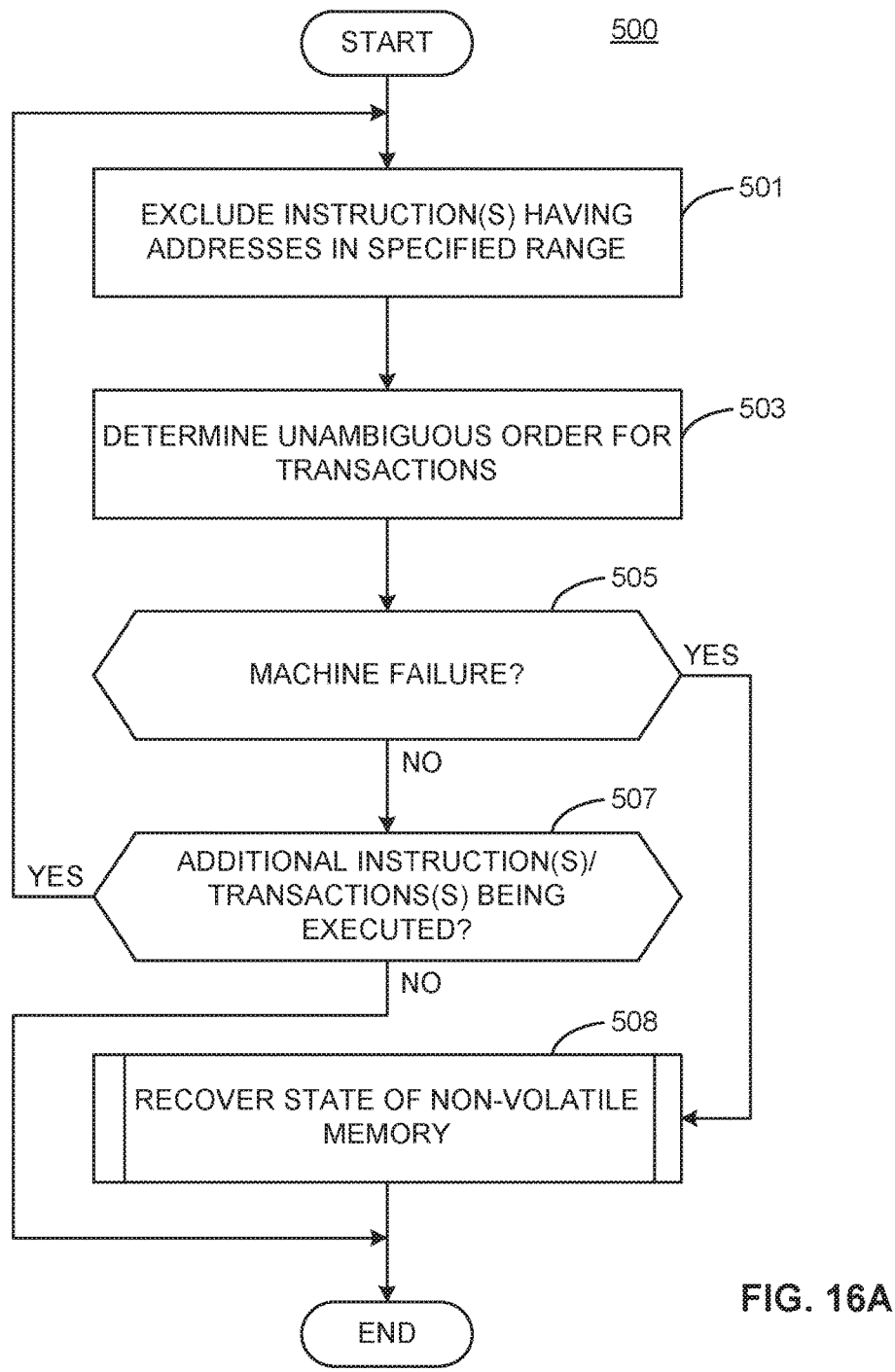
FIG. 16A shows a flowchart representative of example machine readable instructions that may be executed to implement the example transaction execution manager of FIG. 5 to carry out a method to provide atomicity in NVM under hardware transactional memory in accordance with the teachings of this disclosure.
Figure 16B:
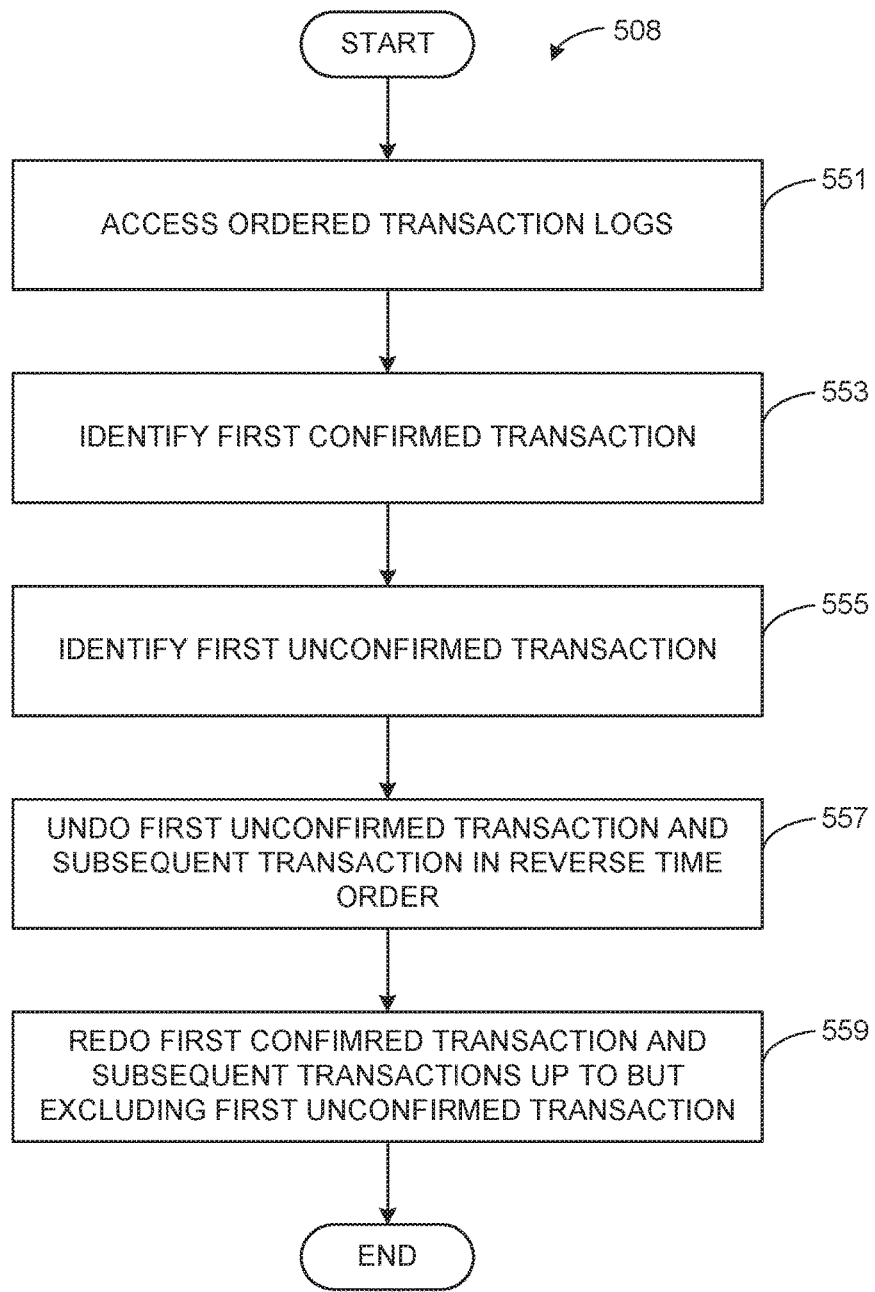
FIG. 16B show operations performed as a part of the execution of the method of FIG. 16A.

Flowcharts representative of example machine readable instructions for implementing the transaction execution manager 201 for transaction execution atomicity in NVM under hardware transactional memory of FIG. 5 are shown in FIGS. 16A and 16B. In these examples, the machine readable instructions comprise one or more programs for execution by one or more processors such as the processor 612 shown in the example processor platform 600 discussed below in connection with FIG. 17. The program(s) may be embodied in software stored on a tangible computer readable storage medium such as a compact disk read-only memory (CD-ROM), a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) are described with reference to the flowcharts illustrated in FIGS. 16A and 16B, many other methods of implementing the example transaction execution manager 201 for transaction execution atomicity in NVM under hardware transactional memory may alternatively be used. For example, the order of execution of the blocks may be changed, and/or some of the blocks described may be changed, eliminated, or combined.

As mentioned above, the example process of FIGS. 16A and 16B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 16A and 16B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 16A shows a flowchart 500 of a method for transaction execution atomicity in NVM in hardware transactional memory in accordance with the teachings of this disclosure. The flowchart includes processes that, in some examples, can be carried out by processors and electrical components under the control of computer-readable and computer-executable instructions. Although specific operations are disclosed in the flowcharts, such operations are described by way of example only. That is, the examples of FIGS. 16A and 16B are well suited to performing various other additional and/or alternative variations of the operations in the flowchart.

The example transaction excluder 206 excludes loads and stores from a range of serialized code body that access a range of physical addresses 212 (block 501). The example transaction excluder 206 (FIG. 5) works cooperatively with the transaction manager 205 (FIG. 5) to track loads and stores from a range of TSX serialized code body and hides modifications until it reaches the end of that code body.

The example transaction tracker 210 (FIG. 15) determines an unambiguous order among transaction logs (block 503). For example, the transaction tracker 210 distinguishes between transactions that execute XEND instructions and are thereafter untracked by logs (transactions that execute COMMIT only), and other transactions. In some examples, the transaction tracker 210 tracks the order among transaction logs by utilizing monotonic counters, time value tokens, time ordered log records, and status tags/markers.

The example state recoverer 214 (FIGS. 5 and 15) determines if there is a machine failure (block 505). If it is determined that there is a machine failure, control proceeds to block 508, where the state of the machine is recovered. If it is determined that there is not a machine failure, control proceeds to block 507 where it is determined if there are additional instructions/transactions to be executed. If the example state recoverer 214 determines that there are additional instructions/transaction to be executed (block 507), then control returns to block 501. If the example state recoverer 214 determines that there are no additional instructions/transactions to be executed (block 507) then control proceeds to the end.

The example state recoverer 214 (FIGS. 5 and 15), in response to transaction completion uncertainty, recovers the state of the machine (block 508). For example, the state recoverer 214 recovers state by: (1) identifying a first transaction T1 (e.g., G in FIG. 13) that recorded a COMMIT tag/flag/marker but failed to record a CONFIRM tag/flag/marker, (2) undoing transactions in reverse time order starting at a last transaction T2 (e.g., M in FIG. 13) that recorded a COMMIT tag/flag/marker up to and including the first transaction T1 and (3) redoing transactions in forward time order from a sequentially first transaction T0 (e.g., A in FIG. 13) that is identified periodically, up to, but not including transaction T1.

FIG. 16B shows operations performed as a part of block 508 in FIG. 16A. As part of block 508 in FIG. 16B, the example state recoverer 214 accesses ordered transaction logs (block 551). For example, the state recoverer 214 can access the ordered transaction logs from block 503 of FIG. 16A. The state recoverer 214 identifies a first confirmed transaction (block 553). For example, state recoverer 214 can identify a first confirmed transaction such as transaction A of FIG. 13 as the first confirmed transaction. The example state recoverer 214 identifies the first committed but unconfirmed transaction (block 555). For example, state recoverer 214 can identify a first committed but unconfirmed transaction such as transaction G of FIG. 13 as the first committed but unconfirmed transaction. The example state recoverer 214 undoes transactions subsequent to the first committed but unconfirmed transaction in reverse time order up to and including the first committed but unconfirmed transaction (block 557). The example state recoverer 214 redoes the first committed and confirmed transaction and subsequent committed and confirmed transactions in forward time order up to but excluding the first committed but unconfirmed transaction (block 559).

Figure 17:
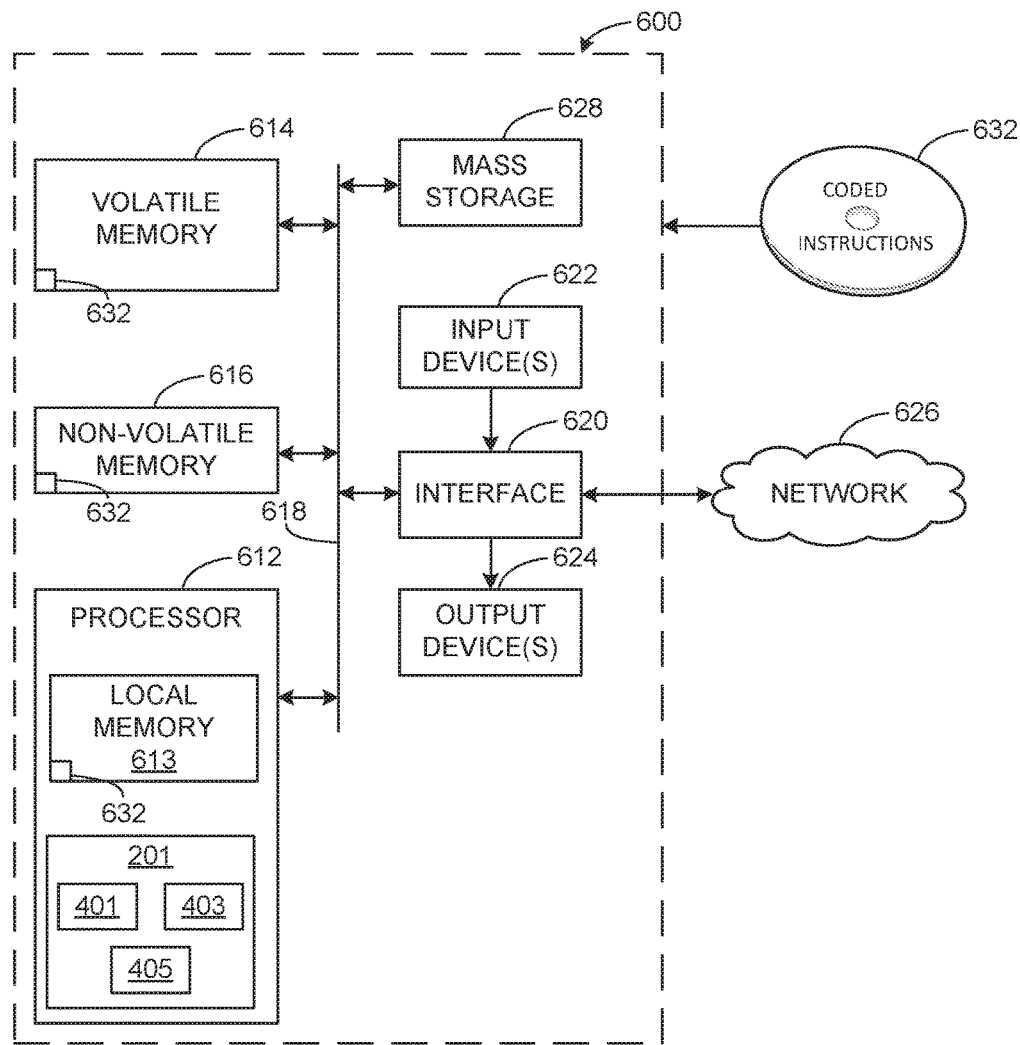
FIG. 17 is a block diagram of an example processor platform that may execute machine-readable instructions of FIG. 5 to implement the example transaction execution manager of FIG. 5 and/or the example apparatus of FIG. 4 to perform a process to provide atomicity in NVM under hardware transactional memory in accordance with the teachings of this disclosure.

FIG. 17 is a block diagram of an example processor platform 600 capable of executing the instructions of FIG. 16A to implement the apparatus of FIG. 15. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The example processor 612 of FIG. 17 implements the transaction excluder 206, the transaction tracker 210 (including monotonic counter 201a, transaction state tracker 201b and time value token provider 201c) and the state recoverer 214.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

In one example, transaction execution manager 201 for transaction execution atomicity in NVM under hardware transactional memory can be included as a part of processor 612. In one example, transaction execution manager 201 for transaction execution atomicity in NVM under hardware transactional memory can be constituted by circuitry that implements an algorithm for transaction execution atomicity in NVM under hardware transactional memory.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 that may be used to implement the process of FIG. 16A may be stored in the mass storage device 628, in the volatile memory 614, in the non-volatile memory 616, and/or on a removable tangible computer readable storage medium such as a CD or DVD.

Example 1 is an apparatus to perform atomic transactions in nonvolatile memory (NVM) under hardware transactional memory, the apparatus comprising, a transaction tracker to arrange transaction logs in an order based on when corresponding transactions were executed, and a state recoverer to use the ordered transaction logs to recover data states of the nonvolatile memory by: identifying a first unconfirmed transaction associated with a transaction completion uncertainty event based on a corresponding one of the transaction logs including a first commit marker but not including a confirm marker, undoing first ones of the transactions in reverse time order starting at a last transaction that recorded a second commit marker, up to and including the first unconfirmed transaction that recorded the first commit marker, and redoing second ones of the transactions in forward time order from a first confirmed transaction up to but not including the first unconfirmed transaction that recorded the first commit marker.

Example 2 includes an apparatus as defined in example 1, further including an excluder to exclude at least one of a load instruction or a store instruction associated with a physical address that is in a range of excluded addresses corresponding to hardware transactional memory.

Example 3 includes an apparatus as defined in example 2, wherein the at least one of the load instruction or the store instruction is a non-transactional instruction based on the physical address being in the range of excluded addresses.

Example 4 includes an apparatus as defined in example 2, wherein the transaction logs are stored in the range of excluded addresses.

Example 5 includes an apparatus as defined in example 1, wherein the transaction tracker includes a monotonic counter to generate sequenced transaction logs.

Example 6 includes an apparatus as defined in example 1, wherein the transaction tracker includes a time value token provider to generate a time value token that is written in a transaction log record for each transaction.

Example 7 includes an apparatus as defined in example 1, wherein a first one of the transaction logs corresponding to the confirmed transaction includes a confirm marker based on execution of a CONFIRM instruction of the confirmed transaction after execution of an XEND instruction of the confirmed transaction.

Example 8 includes an apparatus as defined in example 1, wherein the transactions are caused to complete in an order based on a COMMIT operation sequence number.

Example 9 includes an apparatus as defined in example 1, wherein a XBEGIN operation, a XEND operation, a COMMIT operation and a CONFIRM operation are executed for ones of the corresponding transactions that record both a commit marker and a confirm marker.

Example 10 is a method to perform atomic transactions in NVM under hardware transactional memory, the method comprising, arranging transaction logs in an order based on when transactions were committed; and recovering data states based on the ordered transaction logs by: identifying a first unconfirmed transaction associated with the transaction completion uncertainty event based on a corresponding one of the transaction logs including a first commit marker but not including a confirm marker, undoing first ones of the transactions in reverse time order starting at a last transaction that recorded a second commit marker, up to and including the first unconfirmed transaction that recorded the first commit marker, and redoing second ones of the transactions in forward time order from a first confirmed transaction up to but not including the first unconfirmed transaction that recorded the first commit marker.

Example 11 includes a method as defined in example 10, further including excluding at least one of a load instruction or a store instruction associated with a physical address that is in a range of excluded addresses corresponding to hardware transactional memory.

Example 12 includes a method as defined in example 11, wherein the at least one of the load instruction or the store instruction is a non-transactional instruction based on the physical address being in the range of excluded addresses.

Example 13 includes a method as defined in example 11, further including storing the transaction log entries in the range of physical addresses.

Example 14 includes a method as defined in example 10, wherein the arranging includes generating sequenced transaction logs based on count values corresponding to XBEGIN instructions of transactions and determining when the transactions were executed based on the sequenced transaction logs.

Example 15 includes a method as defined in example 10, wherein the arranging includes generating a time value token and writing the time value token in one of the transaction logs for a corresponding one of the transactions.

Example 16 includes a method as defined in example 10, wherein a first one of the transaction logs corresponding to the confirmed transaction includes a confirm marker based on execution of a CONFIRM instruction of the confirmed transaction after execution of an XEND instruction of the confirmed transaction.

Example 17 includes a method as defined in example 10, further including causing the transactions to complete in an order based on a COMMIT operation sequence number.

Example 18 includes a method as defined in example 10, wherein a XBEGIN operation, a XEND operation, a COMMIT operation and a CONFIRM operation are executed for ones of the corresponding transactions that record both a commit marker and a confirm marker.

Example 19 is a computer readable storage medium comprising instructions that, when executed, cause a machine to at least, track an order among transaction log entries including arranging transaction logs in an order based on when corresponding transactions were executed, and use the ordered transaction logs to recover data states of the nonvolatile memory by: identifying a first unconfirmed transaction associated with the transaction completion uncertainty event based on a corresponding one of the transaction logs including a first commit marker but not including a confirm marker, undoing first ones of the transactions in reverse time order starting at a last transaction that recorded a second commit marker, up to and including the first unconfirmed transaction that recorded the first commit marker, and redoing second ones of the transactions in forward time order from a first confirmed transaction up to but not including the first unconfirmed transaction that recorded the first commit marker.

Example 20 includes a computer readable data storage medium as defined in example 19, further causing a machine to at least exclude at least one of a load instruction associated with a physical address that is in a range of excluded addresses corresponding to hardware transactional memory.

Example 21 includes a computer readable storage medium as defined in example 20, wherein the at least one of the load instruction or the store instructions is a non-transactional instruction based on the physical address being in the range of excluded addresses.

Example 22 includes a computer readable storage medium of as defined in example 20, wherein the transaction logs are stored in the range of physical addresses.

Example 23 includes a computer readable storage medium of as defined in example 19, wherein arranging an order among transaction log entries includes generating sequenced transaction logs based on count values corresponding to XBEGIN instructions of transactions and determining when the transactions were executed based on the sequenced transaction logs.

Example 24 includes a computer readable storage medium of as defined in example 19, wherein arranging an order among transaction log entries includes generating a time value token and writing the time value token in one of the transaction logs for a corresponding one of the transactions.

Example 25 includes a computer readable storage medium as defined in example 19, wherein the transactions are caused to complete in time order based on a COMMIT operation sequence number.

Example 26 includes a computer readable storage medium as defined in example 19, wherein a XBEGIN operation, a XEND operation, a COMMIT operation and a CONFIRM operation are executed for ones of the corresponding transactions that record both a commit marker and a confirm marker.

Example 27 is a system to perform atomic transactions in NVM under hardware transactional memory, the method comprising, means for arranging transaction logs in an order based on when transactions were committed; and means for recovering data states based on the ordered transaction logs, including: means for identifying a first unconfirmed transaction associated with the transaction completion uncertainty event based on a corresponding one of the transaction logs including a first commit marker but not including a confirm marker, undoing first ones of the transactions in reverse time order starting at a last transaction that recorded a second commit marker, up to and including the first unconfirmed transaction that recorded the first commit marker, and redoing second ones of the transactions in forward time order from a first confirmed transaction up to but not including the first unconfirmed transaction that recorded the first commit marker.

Example 28 includes a system as defined in example 27, further including excluding at least one of a load instruction or a store instruction associated with a physical address that is in a range of excluded addresses corresponding to hardware transactional memory.

Example 29 includes a system as defined in example 28, wherein the at least one of the load instruction or the store instruction is a non-transactional instruction based on the physical address being in the range of excluded addresses.

Example 30 includes a system as defined in example 28, further including storing the transaction log entries in the range of physical addresses.

Example 31 includes a system as defined in example 27, wherein the arranging includes generating sequenced transaction logs based on count values corresponding to XBEGIN instructions of transactions and determining when the transactions were executed based on the sequenced transaction logs.

Example 32 includes a system as defined in example 27, wherein the arranging includes generating a time value token and writing the time value token in one of the transaction logs for a corresponding one of the transactions.

Example 33 includes a system as defined in example 27, wherein a first one of the transaction logs corresponding to the confirmed transaction includes a confirm marker based on execution of a CONFIRM instruction of the confirmed transaction after execution of an XEND instruction of the confirmed transaction.

Example 34 includes a system as defined in example 27, further including causing the transactions to complete in an order based on a COMMIT operation sequence number.

Example 35 includes a system as defined in example 27, wherein a XBEGIN operation, a XEND operation, a COMMIT operation and a CONFIRM operation are executed for ones of the corresponding transactions that record both a commit marker and a confirm marker.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform atomic transactions in non-volatile memory (NVM) under hardware transactional memory, the apparatus comprising:
   a transaction tracker to arrange transaction logs in an order based on when corresponding transactions were executed; and
   a state recoverer to use the ordered transaction logs to recover data states of the nonvolatile memory by:
      identifying a first unconfirmed transaction associated with a transaction completion uncertainty event based on a corresponding one of the transaction logs including a first commit marker but not including a confirm marker,
      undoing first ones of the transactions in reverse time order starting at a last transaction that recorded a second commit marker, up to and including the first unconfirmed transaction that recorded the first commit marker, and
      redoing second ones of the transactions in forward time order from a first confirmed transaction up to but not including the first unconfirmed transaction that recorded the first commit marker.

2. The apparatus of claim 1, further including an excluder to exclude at least one of a load instruction or a store instruction associated with a physical address that is in a range of excluded addresses corresponding to hardware transactional memory.

3. The apparatus of claim 2, wherein the at least one of the load instruction or the store instruction is a non-transactional instruction based on the physical address being in the range of excluded addresses.

4. The apparatus of claim 2, wherein the transaction logs are stored in the range of excluded addresses.

5. The apparatus of claim 1, wherein the transaction tracker includes a monotonic counter to generate sequenced transaction logs.

6. The apparatus of claim 1, wherein the transaction tracker includes a time value token provider to generate a time value token that is written in a transaction log record for each transaction.

7. The apparatus of claim 1, wherein a first one of the transaction logs corresponding to the confirmed transaction includes a confirm marker based on execution of a CONFIRM instruction of the confirmed transaction after execution of an XEND instruction of the confirmed transaction.

8. The apparatus of claim 1, wherein the transactions are caused to complete in an order based on a COMMIT operation sequence number.

9. The apparatus of claim 1, wherein XBEGIN, XEND, COMMIT and CONFIRM operations are executed for the corresponding transactions that record both a commit and a confirm marker.

10. A method to perform atomic transactions in NVM under hardware transactional memory, the method comprising:
arranging transaction logs in an order based on when transactions were committed; and
recovering data states based on the ordered transaction logs by:
identifying a first unconfirmed transaction associated with the transaction completion uncertainty event based on a corresponding one of the transaction logs including a first commit marker but not including a confirm marker,
undoing first ones of the transactions in reverse time order starting at a last transaction that recorded a second commit marker, up to and including the first unconfirmed transaction that recorded the first commit marker, and
redoing second ones of the transactions in forward time order from a first confirmed transaction up to but not including the first unconfirmed transaction that recorded the first commit marker.

11. The method of claim 10, further including excluding at least one of a load instruction or a store instruction associated with a physical address that is in a range of excluded addresses corresponding to hardware transactional memory.

12. The method of claim 11, wherein the at least one of the load instruction or the store instruction is a non-transactional instruction based on the physical address being in the range of excluded addresses.

13. The method of claim 11, further including storing the transaction log entries in the range of physical addresses.

14. The method of claim 10, wherein the arranging includes generating sequenced transaction logs based on count values corresponding to XBEGIN instructions of transactions and determining when the transactions were executed based on the sequenced transaction logs.

15. The method of claim 10, wherein the arranging includes generating a time value token and writing the time value token in one of the transaction logs for a corresponding one of the transactions.

16. The method of claim 10, wherein a first one of the transaction logs corresponding to the confirmed transaction includes a confirm marker based on execution of a CONFIRM instruction of the confirmed transaction after execution of an XEND instruction of the confirmed transaction.

17. The method of claim 10, further including causing the transactions to complete in an order based on a COMMIT operation sequence number.

18. The method of claim 10, wherein a XBEGIN operation, a XEND operation, a COMMIT operation and a CONFIRM operation are executed for ones of the corresponding transactions that record both a commit marker and a confirm marker.

19. A non-transitory computer readable storage medium comprising instructions that, when executed, cause a machine to at least:
track an order among transaction log entries including arranging transaction logs in an order based on when corresponding transactions were executed; and
use the ordered transaction logs to recover data states of the nonvolatile memory by:
identifying a first unconfirmed transaction associated with a transaction completion uncertainty event based on a corresponding one of the transaction logs including a first commit marker but not including a confirm marker,
undoing first ones of the transactions in reverse time order starting at a last transaction that recorded a second commit marker, up to and including the first unconfirmed transaction that recorded the first commit marker, and
redoing second ones of the transactions in forward time order from a first confirmed transaction up to but not including the first unconfirmed transaction that recorded the first commit marker.

20. The computer readable data storage medium claim 19 further causing a machine to at least exclude at least one of a load instruction associated with a physical address that is in a range of excluded addresses corresponding to hardware transactional memory.

21. The computer readable storage medium of claim 20, wherein the at least one of the load instruction or the store instructions is a non-transactional instruction based on the physical address being in the range of excluded addresses.

22. The computer readable storage medium of claim 20, wherein the transaction logs are stored in the range of physical addresses.

23. The computer readable storage medium of claim 19, wherein arranging an order among transaction log entries includes generating sequenced transaction logs based on count values corresponding to XBEGIN instructions of transactions and determining when the transactions were executed based on the sequenced transaction logs.

24. The computer readable storage medium of claim 19, wherein arranging an order among transaction log entries includes generating a time value token and writing the time value token in one of the transaction logs for a corresponding one of the transactions.

25. The computer readable storage medium of claim 19, wherein the transactions are caused to complete in time order based on a COMMIT operation sequence number.

26. The computer readable storage medium of claim 19, wherein XBEGIN, XEND, COMMIT and CONFIRM operations are executed for the corresponding transactions that record both a commit and a confirm marker.

* * * * *

UNITED STATES PATENT AND TRADEMARK OFFICE
CERTIFICATE OF CORRECTION

PATENT NO. : 10,268,502 B2  
APPLICATION NO. : 15/637476  
DATED : April 23, 2019  
INVENTOR(S) : Kshitij A. Doshi, Vadim Sukhomlinov and Roman Dementiev Page 1 of 1

It is certified that error appears in the above-identified patent and that said Letters Patent is hereby corrected as shown below:

In the Claims

Column 30, Line 31 (Claim 20): Replace "claim 19" with --of claim 19--.

Signed and Sealed this  
First Day of October, 2019

Andrei Iancu  
*Director of the United States Patent and Trademark Office*